(12) United States Patent
Lamb et al.

(10) Patent No.: US 7,552,205 B2
(45) Date of Patent: Jun. 23, 2009

(54) DISTRIBUTED TRANSACTION EVENT MATCHING

(75) Inventors: Peter Craig Lamb, Seattle, WA (US); Damon Michael Rolfs, Seattle, WA (US); Christopher C. Smith, Seattle, WA (US)

(73) Assignee: Accenture Global Services GmbH (CH)

( * ) Notice: Subject to any disclaimer, the term of this patent is extended or adjusted under 35 U.S.C. 154(b) by 470 days.

(21) Appl. No.: 10/152,890

(22) Filed: May 21, 2002

(65) Prior Publication Data

US 2005/0198111 A1 Sep. 8, 2005

(51) Int. Cl.
*G06F 15/173* (2006.01)
(52) U.S. Cl. .................... 709/223; 709/224; 709/202; 709/218; 709/244
(58) Field of Classification Search ............... 709/203, 709/223, 224, 202, 218, 244
See application file for complete search history.

(56) References Cited

U.S. PATENT DOCUMENTS

| | | | | |
|---|---|---|---|---|
| 5,508,731 | A | 4/1996 | Kohorn | 348/1 |
| 5,794,221 | A | 8/1998 | Egendorf | 705/40 |
| 5,802,296 | A | 9/1998 | Morse et al. | 395/200.38 |
| 5,848,415 | A | 12/1998 | Guck | 707/10 |
| 5,940,504 | A | 8/1999 | Griswold | |
| 6,026,388 | A | 2/2000 | Liddy et al. | 707/1 |
| 6,029,145 | A * | 2/2000 | Barritz et al. | 705/34 |
| 6,041,316 | A | 3/2000 | Allen | |
| 6,084,865 | A | 7/2000 | Dent | |
| 6,112,181 | A | 8/2000 | Shear et al. | |
| 6,119,229 | A | 9/2000 | Martinez et al. | 713/200 |
| 6,135,646 | A | 10/2000 | Kahn et al. | |
| 6,161,107 | A | 12/2000 | Stern | 707/104 |
| 6,189,008 | B1 | 2/2001 | Easty et al. | |
| 6,202,056 | B1 | 3/2001 | Nuttall | |
| 6,219,788 | B1 | 4/2001 | Flavin et al. | |
| 6,226,618 | B1 | 5/2001 | Downs et al. | 705/1 |
| 6,229,533 | B1 | 5/2001 | Farmer et al. | 345/331 |
| 6,236,994 | B1 | 5/2001 | Swartz et al. | 707/6 |
| 6,263,313 | B1 | 7/2001 | Milsted et al. | 705/1 |

(Continued)

FOREIGN PATENT DOCUMENTS

WO WO 99/31610 A1 6/1999

(Continued)

OTHER PUBLICATIONS

"4i Content Management," http://www.documentum.com/products/content/index.html, Jun. 21, 2000, Documentum, Inc., 2 pp.

(Continued)

*Primary Examiner*—Kenny S Lin
*Assistant Examiner*—Lan-Dai T Truong
(74) *Attorney, Agent, or Firm*—Brinks Hofer Gilson & Lione

(57) ABSTRACT

Methods, data structures, and systems for tracking network events that occur across multiple platforms are disclosed. Entities may enter into business agreements for products and services to be conducted across different platforms and register the terms of those agreements with a tracking computer. The tracking computer can monitor network events and determine settlement amounts to be distributed between the entities involved in a given network event based on the terms of one or more agreements that may be stored in a database.

37 Claims, 15 Drawing Sheets

U.S. PATENT DOCUMENTS

| | | | |
|---|---|---|---|
| 6,334,110 B1 * | 12/2001 | Walter et al. | 705/14 |
| 6,345,256 B1 | 2/2002 | Milsted et al. | 705/1 |
| 6,356,903 B1 | 3/2002 | Baxter et al. | 707/10 |
| 6,418,467 B1 * | 7/2002 | Schweitzer et al. | 709/223 |
| 6,502,131 B1 * | 12/2002 | Vaid et al. | 709/224 |
| 6,839,680 B1 | 1/2005 | Liu et al. | 705/10 |
| 6,842,782 B1 * | 1/2005 | Malik et al. | 709/224 |
| 6,854,009 B1 * | 2/2005 | Hughes | 709/220 |
| 6,857,020 B1 * | 2/2005 | Chaar et al. | 709/226 |
| 6,898,618 B1 * | 5/2005 | Slaughter et al. | 709/203 |
| 6,904,449 B1 * | 6/2005 | Quinones | 709/203 |
| 6,917,979 B1 * | 7/2005 | Dutra et al. | 709/229 |
| 7,092,914 B1 * | 8/2006 | Shear et al. | 705/67 |
| 2001/0011303 A1 * | 8/2001 | Chang et al. | 709/227 |
| 2001/0037316 A1 | 11/2001 | Shiloh | 705/74 |
| 2001/0049632 A1 | 12/2001 | Rigole | 705/26 |
| 2002/0055912 A1 * | 5/2002 | Buck | 705/76 |
| 2002/0077988 A1 | 6/2002 | Sasaki et al. | 705/59 |
| 2002/0087674 A1 * | 7/2002 | Guilford et al. | 709/223 |
| 2002/0107809 A1 * | 8/2002 | Biddle et al. | 705/59 |
| 2002/0143819 A1 * | 10/2002 | Han et al. | 707/513 |
| 2002/0143920 A1 * | 10/2002 | Dev et al. | 709/223 |
| 2002/0152297 A1 * | 10/2002 | Lebourg et al. | 709/223 |
| 2003/0004844 A1 * | 1/2003 | Hueler | 705/35 |
| 2003/0023564 A1 | 1/2003 | Padhye et al. | 705/54 |
| 2003/0046395 A1 * | 3/2003 | Fleming et al. | 709/226 |
| 2003/0053448 A1 * | 3/2003 | Craig et al. | 370/353 |
| 2003/0093798 A1 * | 5/2003 | Rogerson | 725/75 |
| 2003/0225696 A1 | 12/2003 | Niwa | 705/50 |
| 2004/0039704 A1 | 2/2004 | Gilliam et al. | 705/50 |
| 2004/0064471 A1 | 4/2004 | Brown et al. | 707/100 |
| 2005/0171958 A9 * | 8/2005 | Cheng et al. | 707/100 |

FOREIGN PATENT DOCUMENTS

| | | |
|---|---|---|
| WO | WO 01/28141 A1 | 4/2001 |
| WO | WO 01/59635 A1 | 8/2001 |
| WO | WO 01/63532 A1 | 8/2001 |
| WO | WO 01/69903 A1 | 9/2001 |
| WO | WO 02/39351 A2 | 5/2002 |

OTHER PUBLICATIONS

"About Documentum," http://www.documentum.com/company/about/index.html, Jun. 21, 2000, Documentum, Inc., 1 p.

Berg, T., Drakos, N., Valdes, R., "Web-Site Deployment and Operations," Jan. 8, 1999, Gartner Group, Inc., 76 pp.

Black Pearl—Main Body, http://blackpearl.com/solutions/solutions_body.html, Jun. 21, 2000, Black Pearl, Inc. 3 pp.

Black Pearl—Main Body, http://www.blackpearl.com/company/company_body.html, Jun. 21, 2000, Black Pearl, Inc., 2 pp.

"Content management made strategic," Feb. 19, 2001, Infoworld, p. 48.

"Documentum 4i eBusiness Edition starts with:," http//www.documentum.com/products/content/internet-4i/doc4i.html, Jun. 21, 2000, Documentum, Inc., 2 pp.

"Documentum eDeploy™," http://www.documentum.com/produts/content/internet-4i/edeploy.html, Jun. 21, 2000, Documentum, Inc., 1 p.

"Documentum eConnectors™," http://www.documentum.com/products/content/internet-4i/econnectors.html, Jun. 21, 2000 Documentum, Inc., 2 pp.

"Documentum 4i Integrators," http://www.documentum.com/products/content/internet-4i/integrators.html, Jun. 21, 2000 Documentum, Inc., 1 p.

"Documentum FrameLink Product Suite," http://www.documentum.com/products/content/internet-4i/framelink.html, Jun. 21, 2000, Documentum, Inc., 1 p.

Documentum e-Business Development Tools,: http://www.documentum.com/products/content/internet-4i/devstudio.html, Jun. 21, 2000, Documentum, Inc., 2 pp.

Foster, Cormac, "Content Management: Defining Requirements for Competitive Advantage," Mar. 1999, JupiterStrategic Planning Services/SOS99-21, pp. 1-22.

"Glossary," http://www.xchange.com/resource/glossary.asp, Jun. 21, 2000, Exchange Applications, 5 pp.

"IMRglobal," http://www.ca.imrglobal.com/contact.htm, Jun. 21, 2000, 2 pp.

Ingalls, J., Lundy, J., "Where Is Output Headed? Ten Key Trends," Jan. 12, 1999, Gartner Group, Inc., 5pp.

Jee et al., "A DAVIC Video-on-Demand System Based on the RTSP", IEEE Comput. Soc, pp. 231-238, (2001).

Kirzner, R., "Managing Content: The Key to Success in Web Business," Jun. 1999, International Data Corporation, pp. 1-12.

"Knowledge Organizer: Organize your intranet content the way you organize your business," http://www.verity.com/products/ko/, Verity® Knowledge Organizer®, Product Overview, Oct. 13, 2000, Verity, Inc., 2 pp.

Knox, R., "Multichannel Output: Process Changes on Horizon," Apr. 20, 1999, Gartner Group,, Inc., 4 pp.

"Making Clicks and Mortor Click™: Extending relationship business' expertise into e-markets.," 2000, BlackPearl, Inc., 2 pp.

"Open Market e-Business Suite," Oct. 13, 2000, http://www.openmarket.com/cgi-.../Render&c=Collection&cid=OM176UJ9KYB&live=tru, 2 pp.

Robins, S., Mahony, C., "Web Content Management for Pervasive Content," The Yankee Group, Oct. 13, 2000 pp. 1-26.

Seeley, C., Dietrick, B., "Crafting A Knowledge Management Strategy, Part two. Marrying content with IT applications," Knowledge Management Review, Issue 12 Jan./Feb. 2000, pp. 20-23.

"Step 1: Identify your most profitable customers," http://www.xchange.com/resource/step1.asp, Jun. 21, 2000, Exchange Applications, 1 p.

"Step 2: Personalize your marketing efforts through technology," http://www.xchange.com/resource/step2.asp,Jun. 21, 2000, Exchange Applications, 1 p.

"Step 3: Evaluate the results of your strategies," http://www.xchange.com/resource/step3.asp, Jun. 21, 2000,Exchange Applications, 1 p.

"ThomasTech Content Management Solutions," http://www.thomastechsolutions.com/content.htm, Oct. 13, 2000, Thomas Technology Solutions, Inc., 3 pp.

"U.K.'s second largest retailer, Great Universal Stores, purchases VALEX software to increase relevance and impact of marketing campaigns," Jun. 21, 2000, http://www.xchange.com/news/press_releases/1999/1999-07-19-02.asp, Exchange Applications, pp.

"V/5 E business Platform Architecture," http://www.vignette.com/CDA/Site/0,2097,1-1-731-1191-733-1196,FF.html, Jun. 21, 2000, Vignette Corporation, 4 pp.

Vignette Application Power Pack™, 2000, Vignette, 2 pp.

Web Content Management Strategies, Technologies and Markets, 2000, Ovum Ltd., pp. 1-230.

"What is eCRM?," http://www.xchange.com/resource/default.asp, Jun. 21, 2000, Exchange Applications, 1 p.

White, A. S., "Managing the Development and Delivery of Content." May 1999, International Data Corporation, pp. 1-15.

Whitepaper Request, "Evolving to eCRM: How to optimize interactive relationships between you and your customers," http://www.xchange.com/resource/whitepaper.asp, Jun. 21, 2000, Exchange Applications, 1 p.

Communication from the Canadian Patent Office dated Jan. 18, 2008 for Application No. 2,428,679.

* cited by examiner

DISTRIBUTED TRANSACTION EVENT MATCHING

FIELD OF THE INVENTION

The present invention relates generally to network event tracking, and more particularly to methods and systems that track network activities that occur at multiple sites and are delivered across multiple platforms.

BACKGROUND OF THE INVENTION

Modern commerce and promotional activities that are conducted across networks, such as the Internet, can involve several discrete entities. There has been a clear trend toward structuring agreements between the discrete entities so that compensation is performance-based. For example, a retail web site may desire to compensate a portal web site based on transactions conducted by consumers referred to the retail web site by the portal web site. This is as opposed to the retail web site paying a flat monthly advertising fee to the portal web site.

The flexibility available to entities conducting commercial transactions over networks has been limited. The complexity of the agreements that the entities can enter into has been limited because of the lack of sufficient tracking and reporting tools. Tracking has been a particular problem when activities have been performed across multiple platforms such as the Internet, wireless networks, digital television, and off-line communication methods. As a result, entities have often paid lump sum payments for services that may not have been performed.

Therefore, there exists a need in the art for tracking and reporting tools that monitor and report commerce and promotional activities conducted across networks, so that entities involved in transactions are not limited in the complexity of the compensation agreements that they can enter into.

SUMMARY OF THE INVENTION

The present invention overcomes the problems and limitations of the prior art by providing methods and systems that monitor and report network events that occur across multiple platforms. Accurately and efficiently monitoring and reporting network events that occur across multiple platforms allows entities to enter into increasingly complex compensation agreements that may be performance-based. The compensation agreements may include pay per use, pay per sale, revenue sharing, tiered pricing, volume discounts or other arrangements agreed to by the parties. After detecting a network event, the event may be analyzed with a set of rules agreed upon by two or more entities to determine the contractual obligations of the entities. For example, a first company may enter into an advertising contract with a second company that provides Internet based, cable television based and satellite television based advertising. The terms of the contract may be set so that the advertising fees are a function of the combined advertising across all three platforms.

In one embodiment, a method of tracking network events is provided. The method includes the steps of monitoring network events conducted across at least two platforms and matching the monitored network events to sets of rules. The rules may include pricing and settlement parameters. The monitoring step may include receiving an identification of a provider, end user and an associated provided network event. Moreover, the matching step may include associating at least two entities involved with the network event to a set of rules and determining a settlement between the at least two entities.

In another embodiment, a system for tracking network events is provided. The system includes a computer that receives network event information from a first entity coupled to a first platform and a second entity coupled to a second platform that is different from the first platform. The computer includes computer-executable instructions for performing the steps of: monitoring network events conducted across at least two platforms, and matching the monitored network events to sets of rules.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

DETAILED DESCRIPTION OF THE INVENTION

Figure 1:
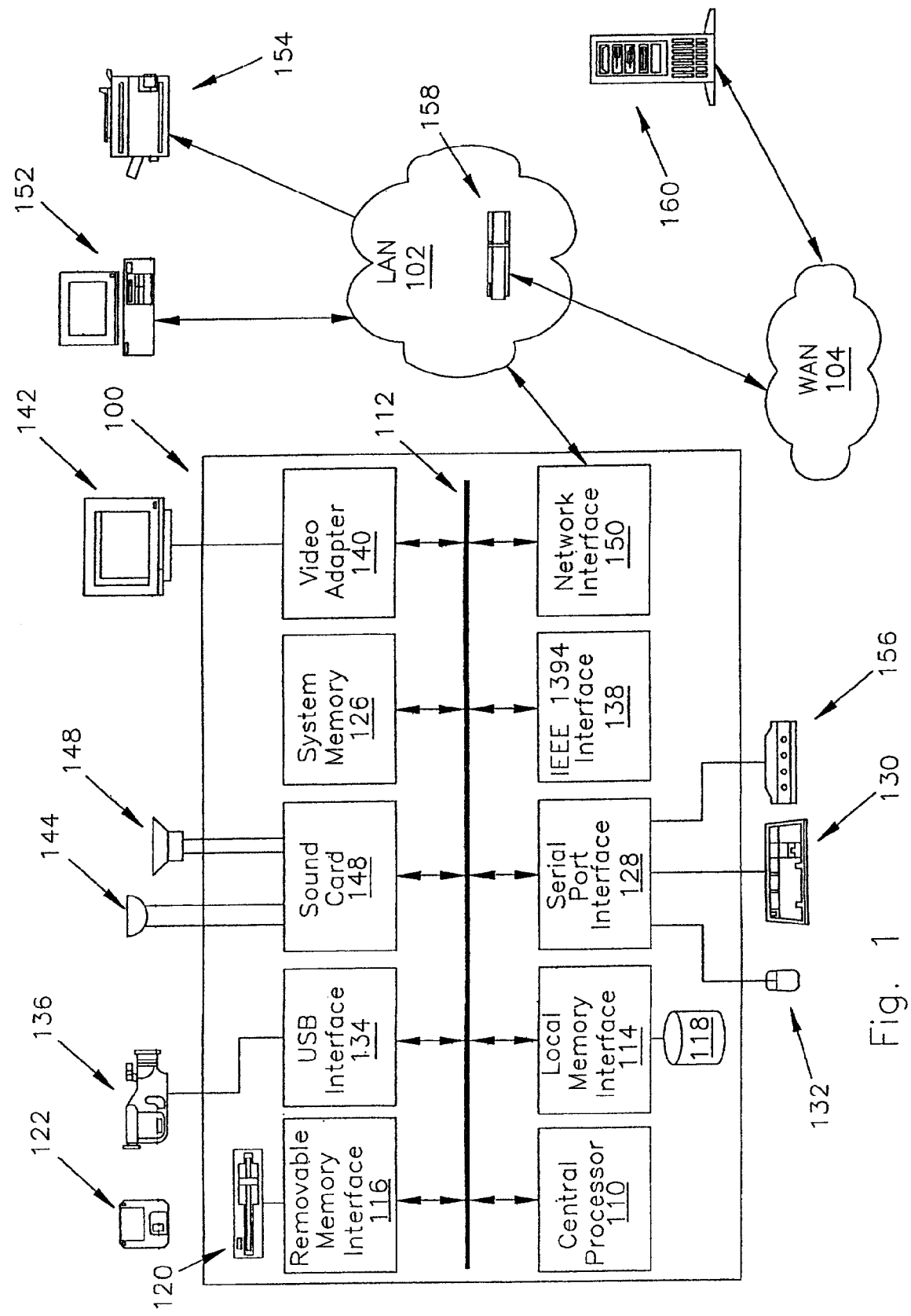
FIG. 1 shows a workstation and network connections that may be utilized to implement aspects of the invention.

Elements of the present invention may be embodied on a computer system or components of a computer network. FIG. 1 shows an exemplary operating environment in which a computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures. Those skilled in the art should recognize that various types of computer-assisted devices capable of being connected to a communication network may take advantage of the present invention.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may includes drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hard-wired or wireless mouse, track ball, pen device, or similar device.

Computer 100 may include additional interfaces for connecting peripheral devices to a system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, wireless communication devices may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium. For example, computer 100 may include computer-executable instructions for transmitting information to server 160, receiving, information from server 160 and displaying the received information on display device 142. Furthermore, server 160 may include computer-executable instructions for transmitting hypertext markup language (HTML) or extensible markup language (XML) computer code to computer 100. Other types of markup languages may be used in other embodiments of the present invention.

Figure 2:
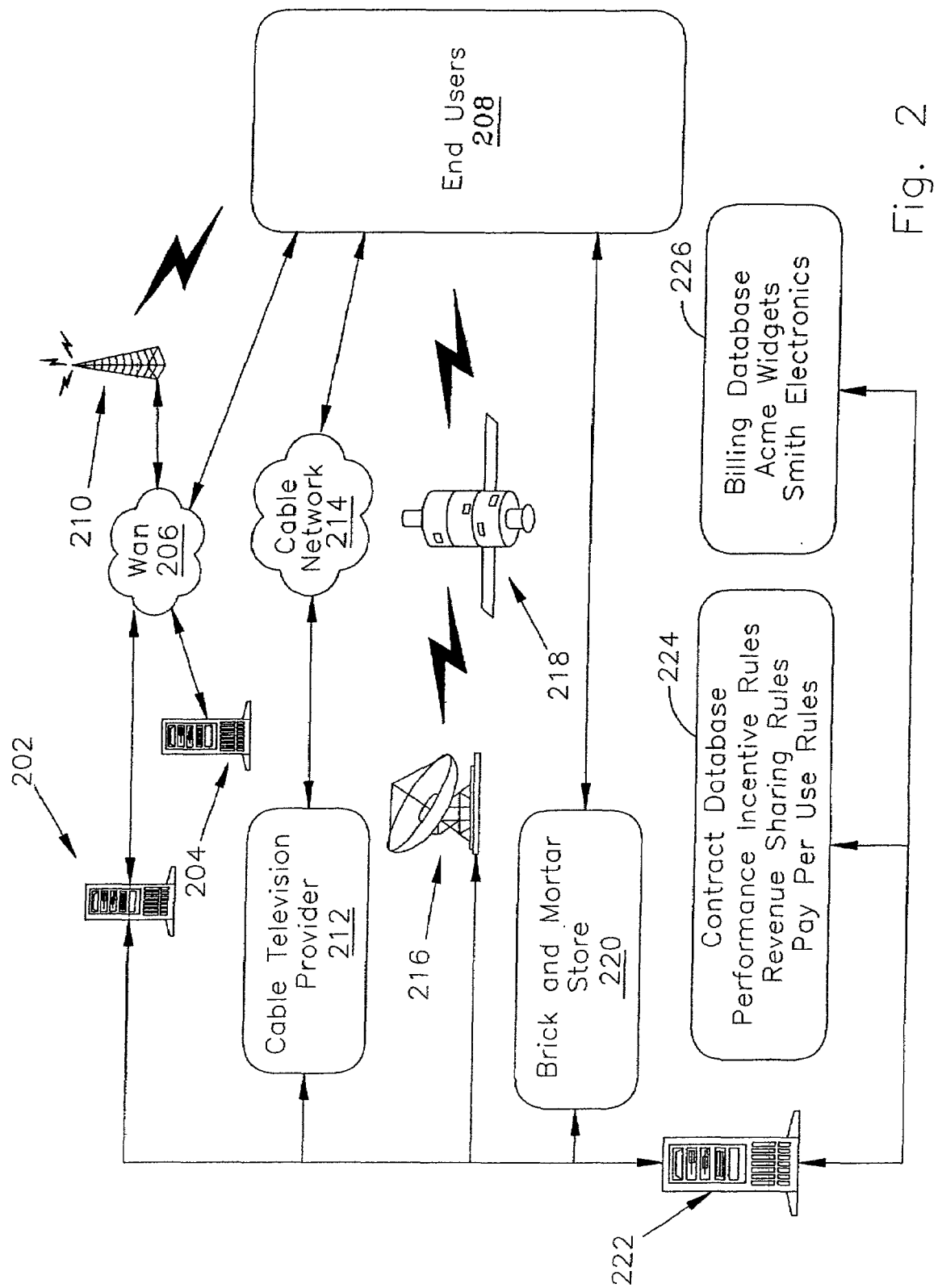
FIG. 2 illustrates a network capable of tracking and monitoring network events across plural platforms in accordance with an embodiment of the invention.

A network that includes the capability of monitoring and tracking network events conducted across plural platforms is shown in FIG. 2. Computer sites 202 and 204 are operational to transmit products and information across a wide area network 206, such as the Internet, to end users 208. End users 208 may receive information and products with devices such as: computer workstations, set-top boxes, televisions, satellite receivers, handheld wireless devices and other electronic devices commonly used to receive electronic products and information. The wide area network 206 may be linked to a wireless communication system 210 that transmits electronic products and information to end users 208 with communication protocols such as the wireless application protocol (WAP). Further, end users 208 can transmit information to the wireless communication system 210 that is sent to the computer sites 202, 204.

FIG. 2 also shows other examples of platforms that may be used to transmit products and information to end users 208. A cable television provider 212 is capable of transmitting cable television products via a cable television network 214 to end users 208. A satellite television provider 216 can transmit satellite television products to end users 208 via a satellite 218. The present intention is not limited to transactions conducted electronically over electronic transmission platforms. For example, end users 208 may visit and purchase items from a store 220. The present invention can also be used to monitor network events across multiple network domains, such as the computer sites 202, 204.

Computer sites 202, 204, cable television provider 212, satellite television provider 216 and store 220 all provide information or products and are coupled to a tracking computer 222. Each of the entities may be coupled to tracking computer 222 by any one or more of a variety of transmission paths that may include the Internet, a wireless communication system, a telephone line or any other transmission path that allows tracking computer 222 to receive information from any of the aforementioned entities.

In the preferred embodiment, the tracking computer 222 is preferentially coupled to a contract database 224. Contract database 224 contains rules that correspond to contracts entered into by entities coupled to tracking computer 222. The tracking computer 222 allows entities to enter into contracts that may be complex and involve discounts or pricing arrangements for transactions that are conducted across at least one platform. For example, cable television provider 212 and computer site 202 may be commonly owned or have an existing business relationship and may enter into a contract with store 220 for providing advertisements to end users 208. The contract may be structured so that the combined advertising fees that store 220 pays to computer site 202 and cable television provider 212 may be a function of events that are conducted across both the wide are network 206 and the cable network 214. The advertising fees may be a function of the combined number of end users 208 that receive products and information from the computer site 202 and view programming provided by the cable television provider 212. One skilled in the art will appreciate that there are an endless number of contract provisions that can be entered into by parties that provide information and products across different platforms. For example, in the example given immediately above, the advertising fees may be a function of the number of unique end users 208 that receive the advertisements so that credit is not received for end users 208 who receive related advertisements via both the wide area network 206 and the cable network 214.

Figure 3:
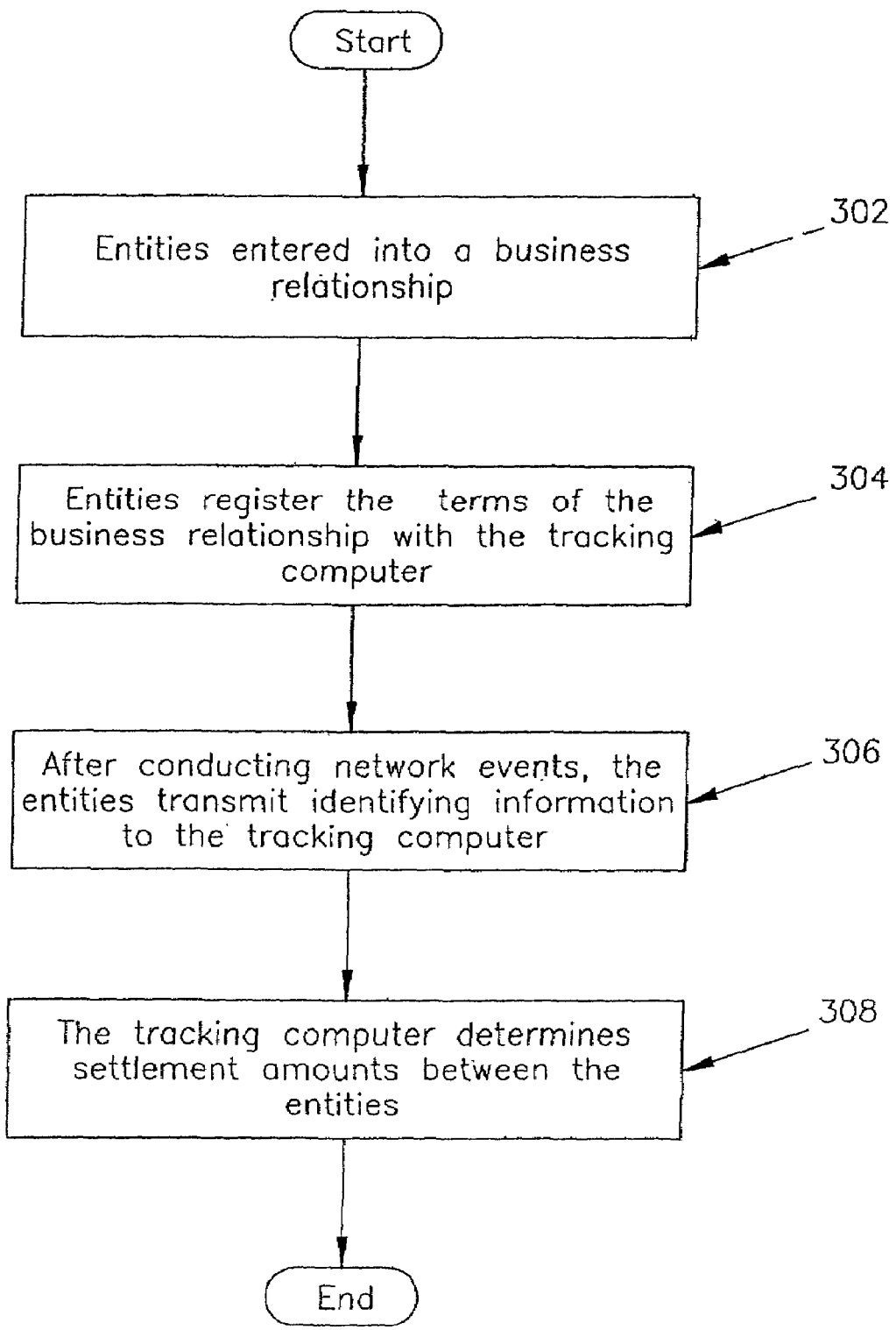
FIG. 3 illustrates a method of tracking network events in accordance with an embodiment of the invention.

FIG. 3 illustrates an overall method that may be utilized by the entities shown in FIG. 2. At step 302, the entities enter into one or more business relationships. The business relationships may involve one or more contracts for the entities to provide advertising or other services or products. In step 304, the entities register the terms of the business relationship with the tracking computer 222. The terms may include settlement terms for distributing compensation between the entities that result from network events. Tracking computer 222 stores any corresponding rules in the contract database 224. After conducting network events, the entities transmit identifying information to the tracking computer 222 in step 306. The identifying information may include information such as the identification of the entities, the type of network event and the end user. Next, in step 308, the tracking computer 222 determines the settlement amounts between the entities.

Figure 4:
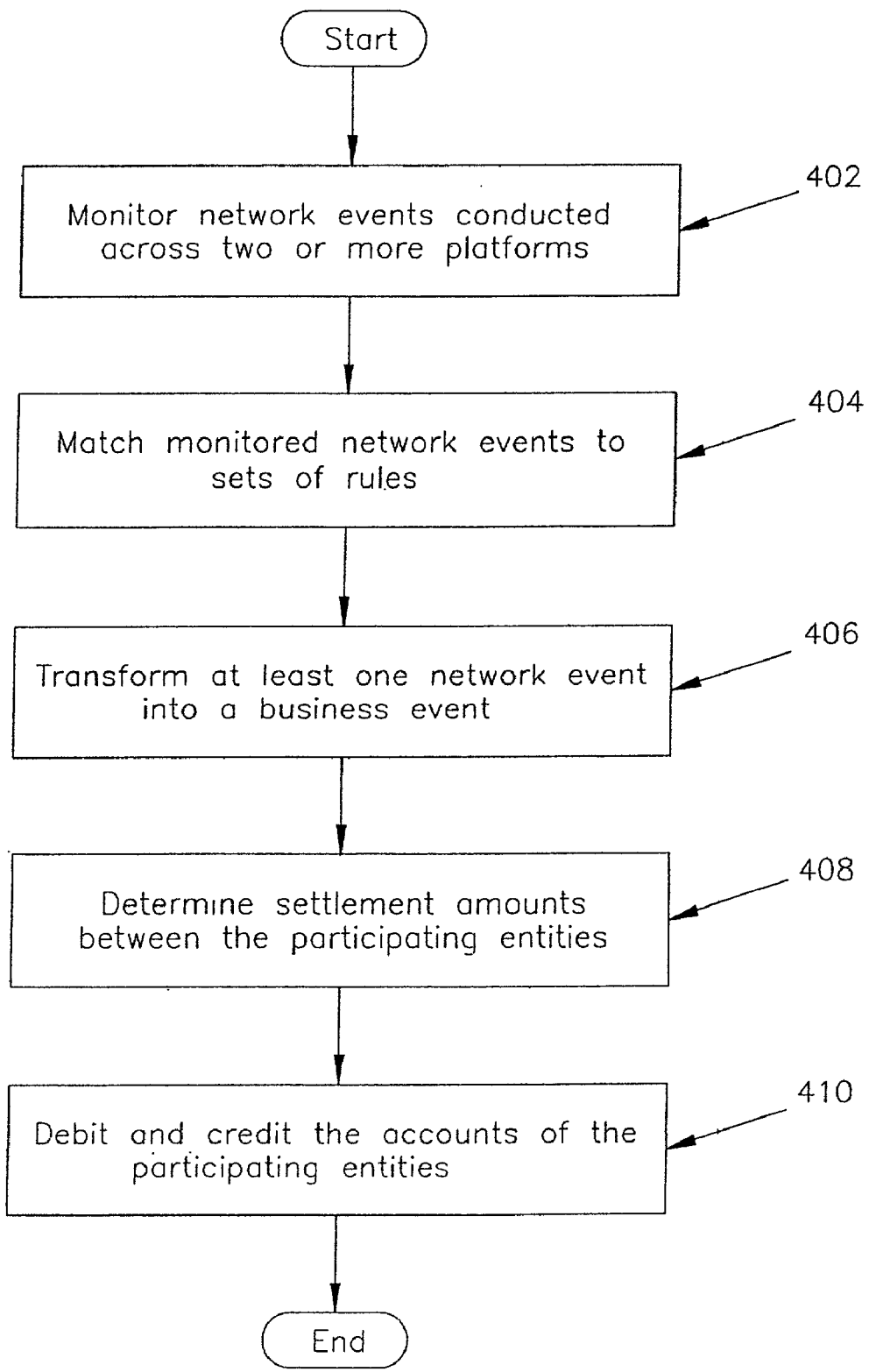
FIG. 4 illustrates a method performed by a tracking computer in accordance with an embodiment of the invention.

FIG. 4 illustrates a method that may be performed by the tracking computer 222 in accordance with a preferred embodiment of the present invention. First, in step 402, the tracking computer 222 monitors network events conducted across two or more platforms. For example, the tracking computer 222 may monitor advertisements displayed to end users 208 by the computer site 202 and advertisements transmitted by the cable television provider 212 to end users 208. Next, in step 404, the network events are matched to a set of rules. As discussed above, the rules are preferentially found in the contract database 224. In step 406, network events are transformed into business events by the tracking computer 222. Business events may include compensation arrangements such as pay per use events, pay per sale events or revenue sharing events. The transformation may involve utilizing the rules stored in the contract database 224, analyzing past events that involve the relevant entities, considering planned future events that involve the relevant entities or considering any other information that is relevant to agreements entered into by the entities.

Settlement amounts between the participating entities are then determined in step 408. The entities that have business relationships with the tracking computer 222 may set up accounts with the tracking computer 222. After determining the settlement amounts, in step 410, the accounts of the participating entities may be debited and credited according to the settlement amounts. Alternatively, the tracking computer 222 may inform the entities of the settlement amounts and the entities may compensate each other using traditional methods for payments.

Figure 5:
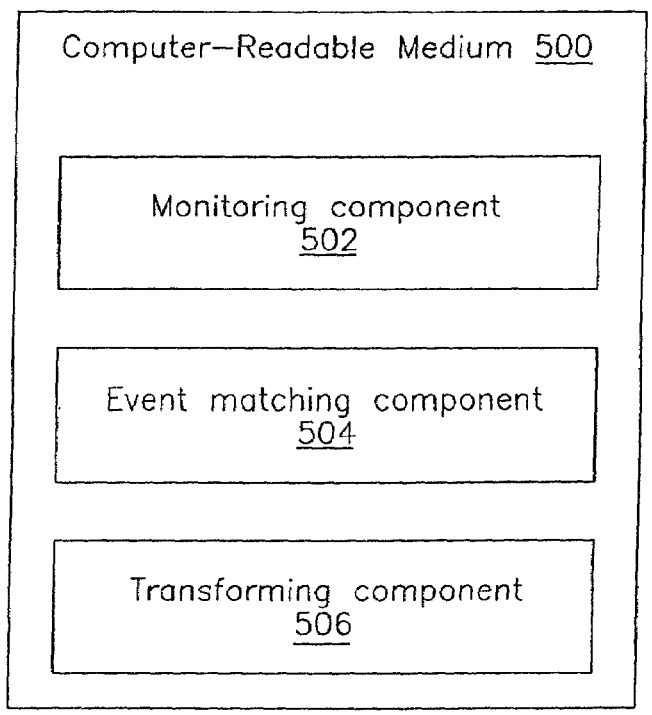
FIG. 5 depicts a computer-readable medium with exemplary computer-executable components or sets of instructions for implementing another embodiment of the invention.

In other embodiments, the above methods or variations thereof could be implemented by using one or more computer-executable components or sets of instructions as illustrated in FIG. 5. More particularly, one or more computer-readable media 500 could store computer-executable components or sets of instructions in order to enable a computer to monitor network events. In this embodiment, the computer-executable components include a monitoring component 502 for tracking network events that occur across more than one platform. An event-matching component 504 is included for matching network events to rules that may be included in a database. A transforming component 506 is preferentially included for transforming network events into business events. Of course, computer executable instructions may be stored on computer readable media for performing the other methods disclosed above.

Figure 6:
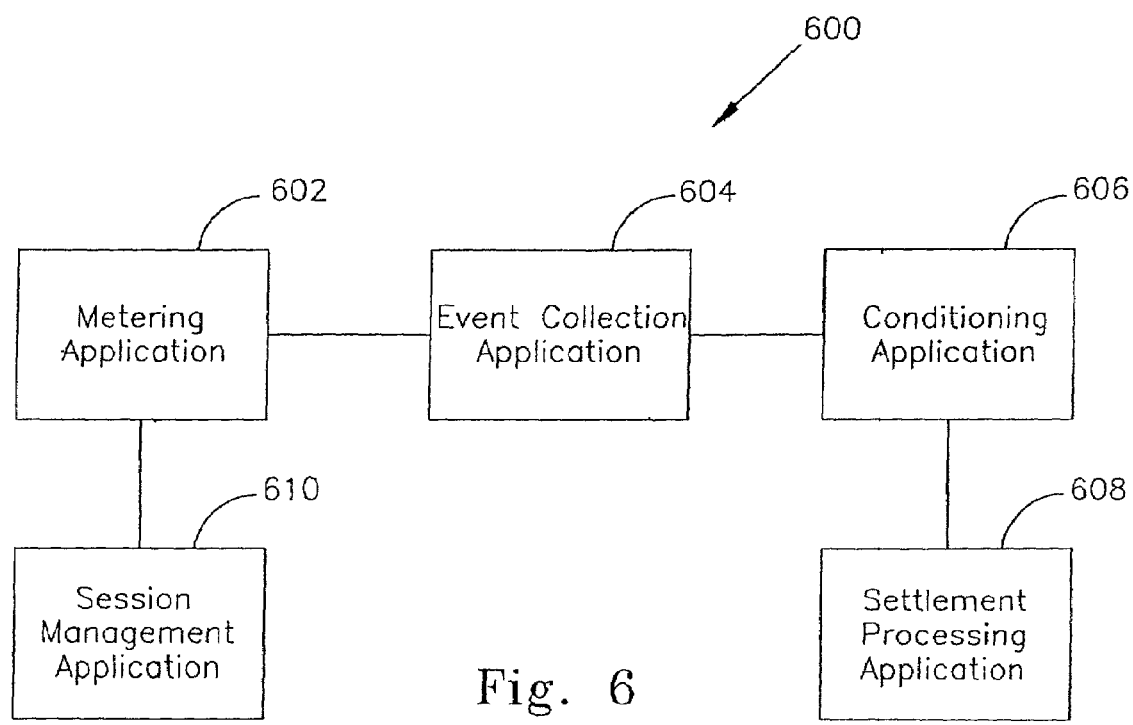
FIG. 6 illustrates a system for tracking network events on a distributed network platform.

Referring to FIG. 6, another preferred embodiment of the present invention discloses a system and method for tracking network events 600 on a distributed network platform. In this embodiment, a metering application 602 monitors network events that are generated by the computer sites 202, 204, the cable television provider 212, the satellite television provider 216 and the store 220 and sent to end users 208. During operation, an event collection application 604 receives and processes a plurality of batches of network events that are sent from the metering application 602. A conditioning application 606 applies a predetermined set of rules to the batches of information received by the event collection application 604 to interpret component business events according to defined contractual relationships. A settlements processing application 608 will determine settlement distributions, by party, for payment clearance and reporting purposes. A session management application 610 provides the ability to associate network events with respective end users 208.

The metering application 602 provides the ability to unobtrusively monitor network traffic looking only for those events that match specific contractual events between parties as defined within predefined contract clauses. This data is passed to the event collection application 604 as network events. The network events comprise the raw data used for conditioning and settlements processing. The metering application 602 may be located on the tracking computer 222 or on other servers connected to the various types of network platforms capable of being supported by the present invention.

The events collection application 604 is responsible for processing and interpreting batches of network events. During operation, the events collection application 604 is responsible for: 1) receiving a batch of network events from multiple metering applications 602, preferentially sent using an XML file format; 2) archiving the batches; 3) creating network event objects from the XML batch; and 4) validating the batch and included network events. The events collection application 604 is also preferentially responsible for 1) matching network events to one another and to a respective contract clause; 2) promoting network events to business events; and 3) sending bundles of business events to the conditioning application 606 and settlements processing application 608 for further processing. The event collection application 604, as well as the other applications, may be located on the tracking computer 222, but may also be located on other gateway server(s) connected to the network platform.

The conditioning application 606 will apply valuation information to business events as required for settlements processing. The conditioning application 606 accepts ordered event bundles from the event collection application 604 and interprets their component business events according to a defined contract clause. A conditioner will apply a base-value to each business event upon completing execution of applicable base-value determination activities defined within that contract clause. Any applicable modifiers (i.e. discounts, promotions, or threshold variables) may then be applied to the base-value, resulting in a macro-value. Finally, a conditioned event can be generated and sent to settlements application processing 608 and to an audits and controls application.

The settlement processing application 608 determines settlement distributions, by party, for payment clearance and reporting purposes. The settlement processing application 608 accepts conditioned events from the conditioning application 606 and interprets them according to a defined contract clause. Preferentially, distribution algorithms determine a base-distribution for each party designated within the contract clause. Any applicable modifiers (i.e. discounts, promotions, or threshold variables) will then be applied to each base-distribution, resulting in a macro-distribution. Finally, a distribution object will be created for each party, and a settlement event will be created to hold all distribution objects relating to a specific conditioned event. This settlement event will be published to a clearance reporting application and the audits and controls application. Settlement distribution records will also be sent to parties at their request (for internal accounting, billing, and reconciliation purposes).

The session management application 610 provides the ability to associate and understand the order of network-events generated by a common user. Network event data is generated for downstream matching. A session manager provides a standard set of APIs for generating network events. It provides tracking IDs, transaction IDs and services that the metering application 602 requires for metering network activity. In the preferred embodiment, a set of higher-level business extensions are written on the base APIs so that the session management application 610 can provide session management services for a variety of business requirements.

As generally set forth above, the settlement processing application 608 generates settlement events that are sent to a clearance reporting application and an audits and controls application. The purpose of the clearance reporting application is to provide an online tool for clients to monitor the performance of their contracts. Clients can monitor their contracts at a high level by partner, by contract, and/or by contract clause. These reports will be used by clients to determine accounts payable and accounts receivables for the deals being monitored by the present invention between the client and their partner(s).

The audits and controls application is responsible for storing and tracking financial data for the lifetime of each event, at all stages of the pipeline. The main purpose of auditing is to ensure that every incoming event is accounted for, while the main purpose of maintaining control (monetary) data is to facilitate internal processing such as error and rejection management. Basic performance data related to event throughput is also gathered by the audits and controls application for internal system monitoring.

The audits and controls application will accept events from the event collection application 604, the conditioning application 606, and the settlements processing application 608, and store event data in a persistent audit repository. The component will also determine whether or not to store bundle performance data in a separate performance repository. The audit repository contains complete information on every event at each stage in the pipeline. It preferentially supports system functions such as: 1) simple event tracking using the audit interface; 2) system transparency through the dashboard console; 3) error administration; and 4) rejection management.

A profile management application may also be included to manage profiles. The profile management application is responsible for: 1) determining who can access the application as well as what they have access to (authentication and authorization); 2) enabling users to manage other users including creating users, updating users, creating groups, updating groups, creating meters, and updating meters; 3) enabling users to manage companies (parties) including creating and updating companies, and 4) enabling users to update their own information. User permissions are determined based on user level, user groups applied to the user, and the company the user belongs to. Permissions enable users to access various components within the application as well as perform various functions within those components, such as view reports in the clearance reporting application, or managing users within an administration component.

Depending upon the customer applications that the present invention integrates with, the tasks performed by the metering application 602 can vary widely. The metering application 602 supports the integration of services that are preferentially provided over the Internet. A mobile commerce metering application is also preferentially provided to end users 208 of wireless communication devices. The preferred mobile commerce metering application is an enhanced version of the eCommerce meter that can support specific requirements of a mobile device. For instance, not all devices can store cookies and not all mobile carriers support session management at their gateway. A tightly integrated customer metering application 602 may also be provided that performs the same tasks as a metering application.

A centralized approach is more visible to the end consumer of contract partner clients. The centralized metering approach has the end consumer's web browser do the work of passing the usage information-directly, preferentially, using a simple image request that uses the HTTP protocol. During operation, the metering application 602 may receive a request for a "gif" (graphical information format) file that contains a rich amount of information about the service that the consumer received in conjunction with that request. The image served to the consumer's web browser will be insignificant, non-visible and very small in size by the end user 208. It should not affect the performance or user experience of the browsing of the site.

One aspect of this interaction is that the request sends along a series of parameters than can be constructed, by the metering application 602, into a network event. The request also passes along any session information if the user has already visited an enabled service using the present invention within the context of the user's current location or another independent location. The end user 208 generates a response that is preferentially a non-intrusive image that does not change the user experience. The response will also create a session (through the use of cookies, for example) if this is the first time that a user has visited an enabled service.

Figure 7:
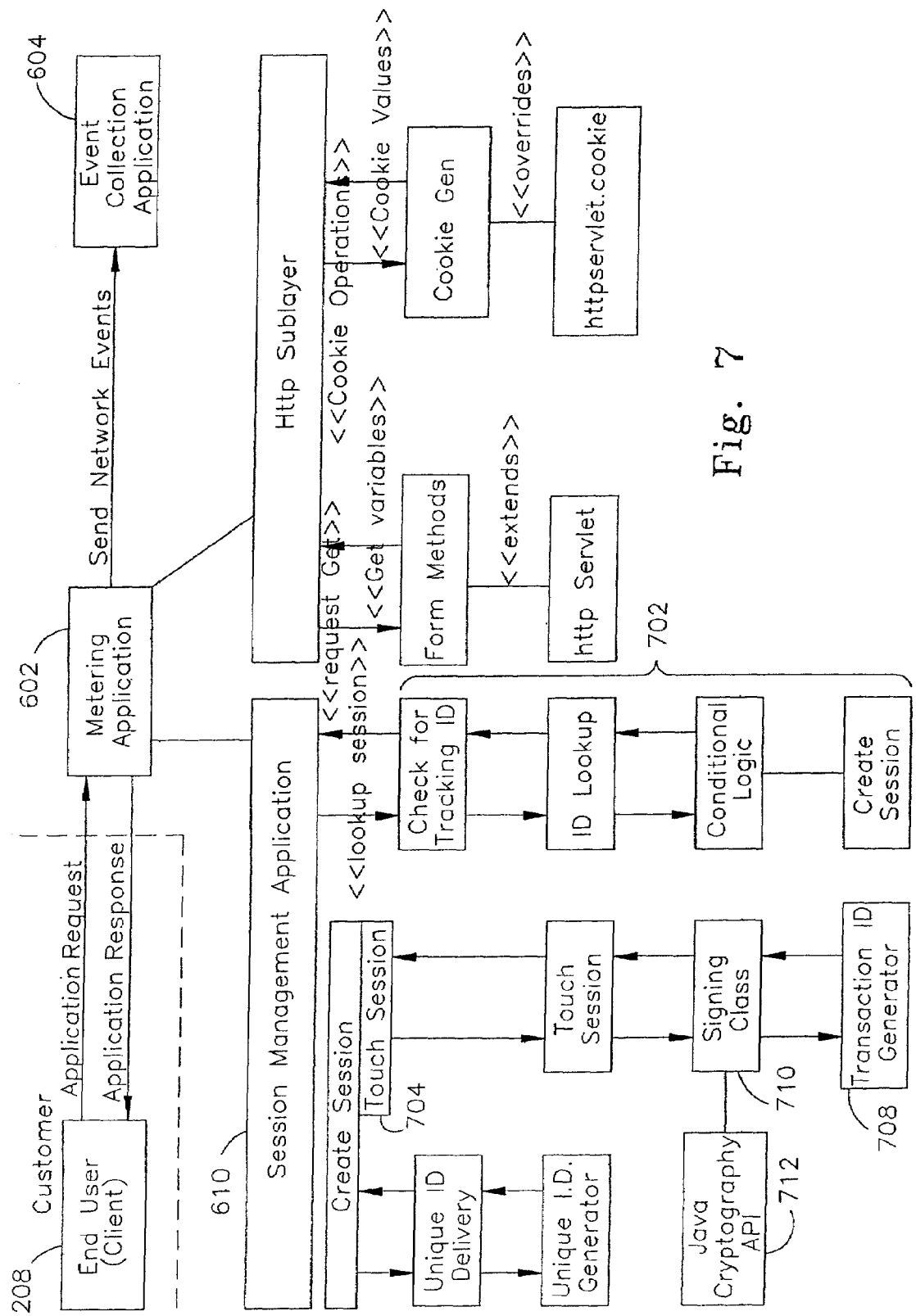
FIG. 7 illustrates a session management application designed for an electronic commerce centralized deployment approach.

Referring to FIG. 7, the session management application 610 provides the ability to associate and understand the order of network events generated by a common end user 208. Network event data is generated for downstream matching. During operation, the session management application 610 provides a standard set of APIs for generating network events. It provides tracking IDs, transaction IDs and services that the metering application 602 requires for metering network activity. Preferentially, a set of higher-level business extensions are written on the base APIs so that the session management application 610 can provide session management services for a variety of business requirements. Preferentially, these approaches include: an eCommerce centralized deployment; an eCommerce distributed deployment; a mobile commerce centralized deployment; an Off-line Client/Server environment; and an EAI interface, which are generally illustrated in FIGS. 7-11.

The session management application 610 provides a set of core services that are used in the management and creation of client sessions. In the preferred embodiment of the present invention, network events are sent to the metering application 602 in the context of a user session. The core services preferentially include a create tracking ID function 702, a touch session function 704, and a look-up tracking ID function 706. The create tracking ID function is responsible for generating a returning tracking ID. The touch session function 704 generates and returns a combination of a sequence and a time stamp called a transaction ID. The look-up tracking function provides mobile commerce support for looking up tracking IDs based on the handset.

Tracking IDs are unique identifications assigned to each end user 208 on the initial request or network event. The create tracking ID function 702 is the interface for creating tracking IDs. Creating a tracking ID involves generating the actual ID and implementing the ID. There are a number of different methods for implementing tracking IDs. In one preferred embodiment, this interface may be implemented as a singleton that generates a tracking ID using some coded logic and a repository of some type so that it can keep track of sequence positions. This interface may also be implemented as a combination of singletons and stateless session EJBs. In this implementation, the singleton would call a session bean using some remote interface. This would allow a centralized approach to ID generation and a distributed approach to the actual delivery of the tracking Ids. In other embodiments, this interface may be implemented through a JDBC connection to a DBMS sequence.

As set forth above, the session management application 610 is also responsible for implementing the touch session function 704. Subsequent network events are tracked through the use of a transaction ID that provides a sequence to the user session. The methods and classes that define the touch session component 704 allow the system to create and return a digitally signed and encrypted transaction ID to the metering application 602. The user's tracking ID is passed in and the system generates the transaction ID using a combination of a time stamp and a numeric sequence. The transaction ID is stored with network event data generated by that user's actions. The touch session method looks up mobile commerce tracking IDs based on the user's handset ID. It would use the lookup session component to match the ID.

Transaction IDs are associated with each subsequent network event generated by an end user 208. In the preferred embodiment, there are some general approaches used to create transaction IDs. Transaction IDs might contain sequences or time stamps. One preferred embodiment uses the following formats for these components of the transaction ID: 1) Time Stamp: 00-00-0000 00:00:00:00; and 2) Sequence: 6 Characters.

The preferred approach is to combine a time stamp with a sequence and a small CRC. Precision of the time stamp should be in milliseconds. This approach would provide the processing pipeline with the ability to order network events in chronological sequence. The end point for a session could be inferred by the length of time since the last network event. This approach would perform well and should avoid complicated sequence generation and assignment schemes.

Network events that rely on independent, incrementing and numeric event sequences are also implemented where cookies are supported on the client device. The session manager sets a name/value pair for the sequence in the user cookie when the session is created. Subsequent requests by the end user 208 would pass the sequence name/value pair to the tracking server 222. Using HTTPSERVLET, the tracking server 222 would increment the sequence and pass the cookie headers back to the client in a response. The sequence and transaction ID would be stored with the network event.

A signing class application 710 encrypts and creates a digital signature for the transaction IDs being returned to the customer-implemented meters. Signing a transaction ID makes it verifiable. Encrypting a transaction ID makes it unreadable. A Java cryptography API 712 could be used to encrypt and create the digital signatures.

Mobile commerce end users 208 might not support the use of cookies. Use of Get and Post Form variables are not recommended. Mobile commerce devices pass a handset ID to the web server. The handset ID is usually defined in a custom http header. Network events are stored based on implementation of the tracking ID. If a tracking ID is created for a mobile user, it is associated with the initial request, which is stored and remembered by the present invention. Since tracking IDs are used to track the mobile user, then that number can still be used to create valid transaction IDs.

Figure 8:
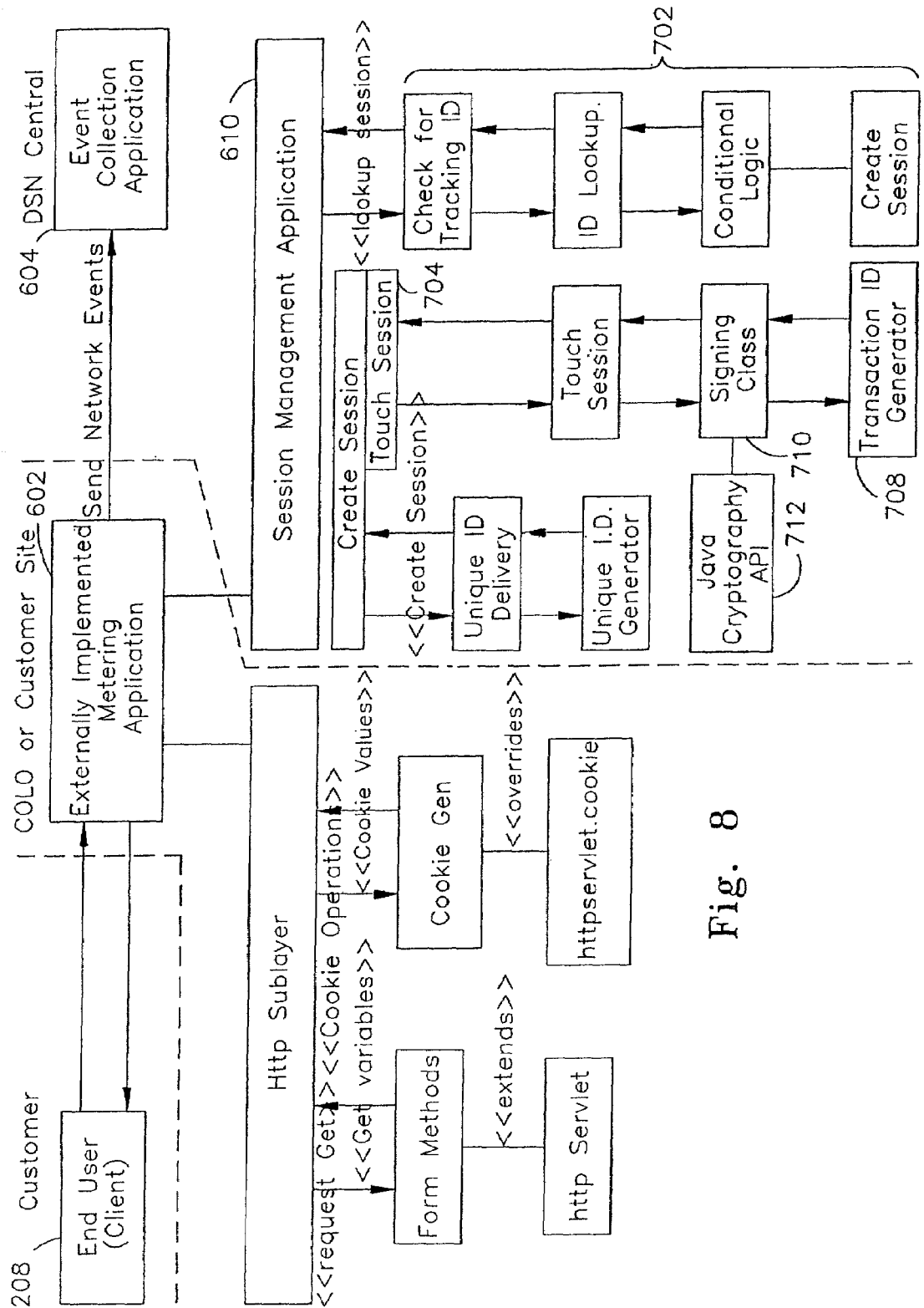
FIG. 8 illustrates a session management application designed for a distributed electronic commerce approach.
Figure 9:
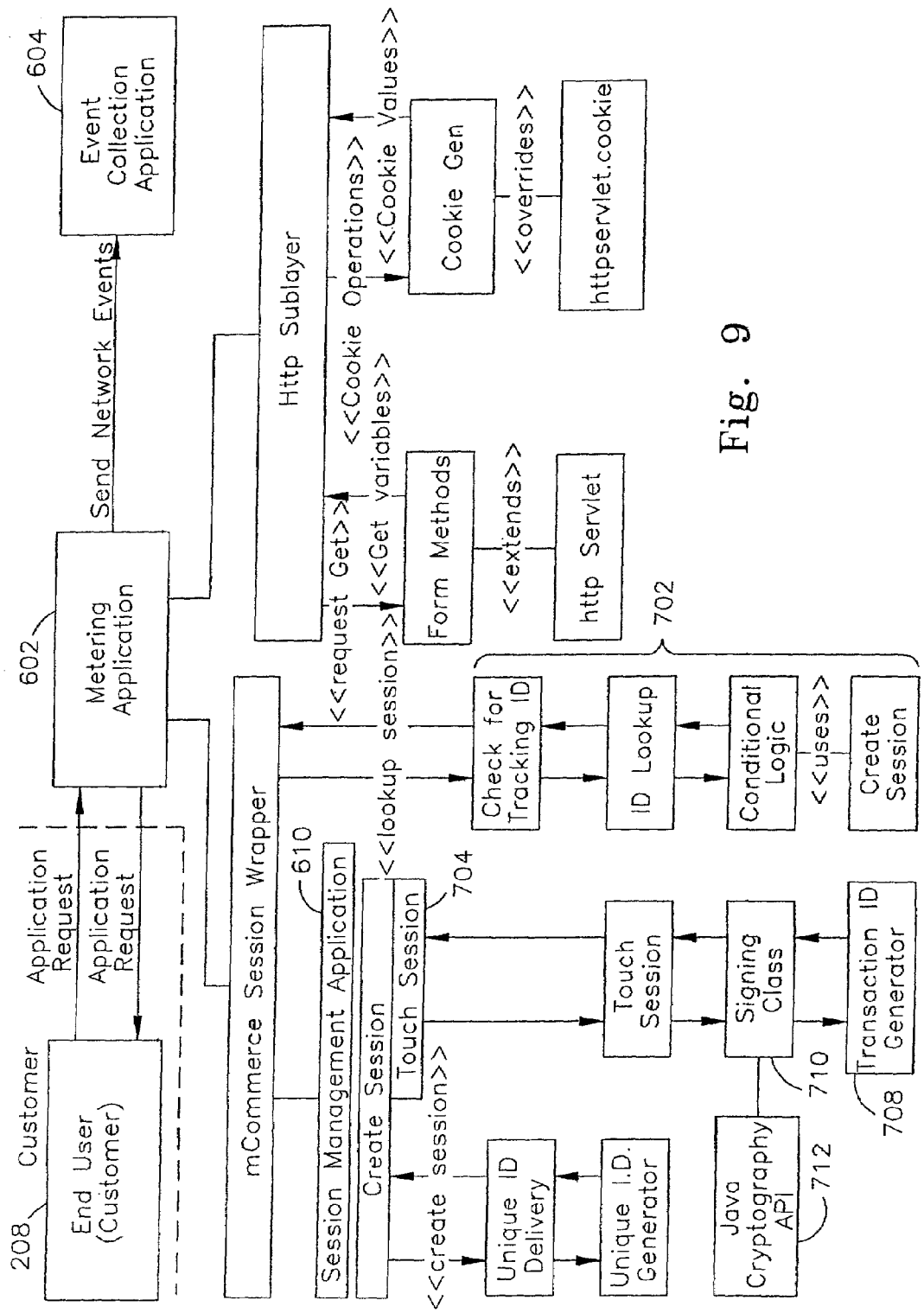
FIG. 9 illustrates a session management application designed for a mobile commerce approach.
Figure 10:
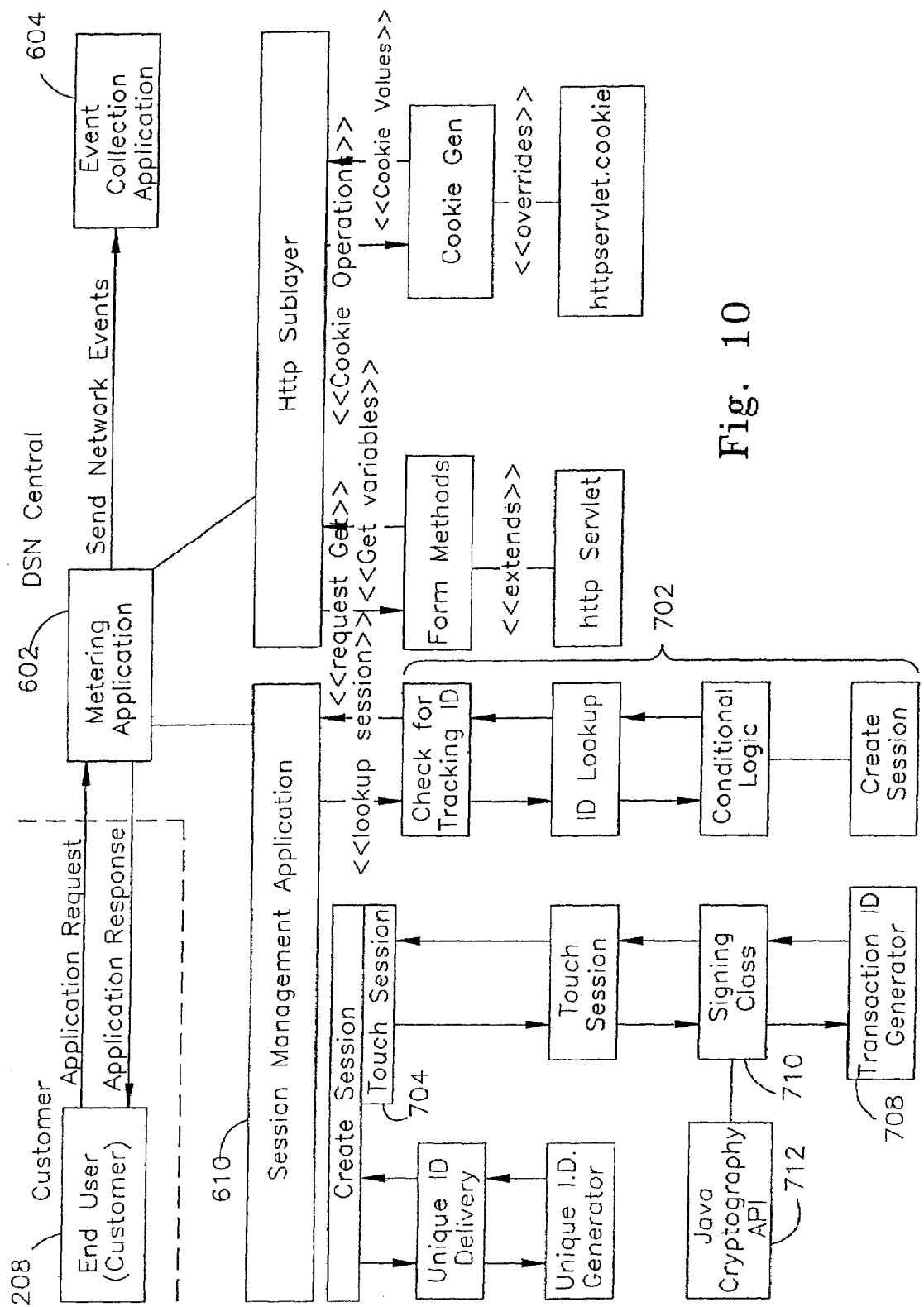
FIG. 10 illustrates a session management application designed for an off-line client/server approach.
Figure 11:
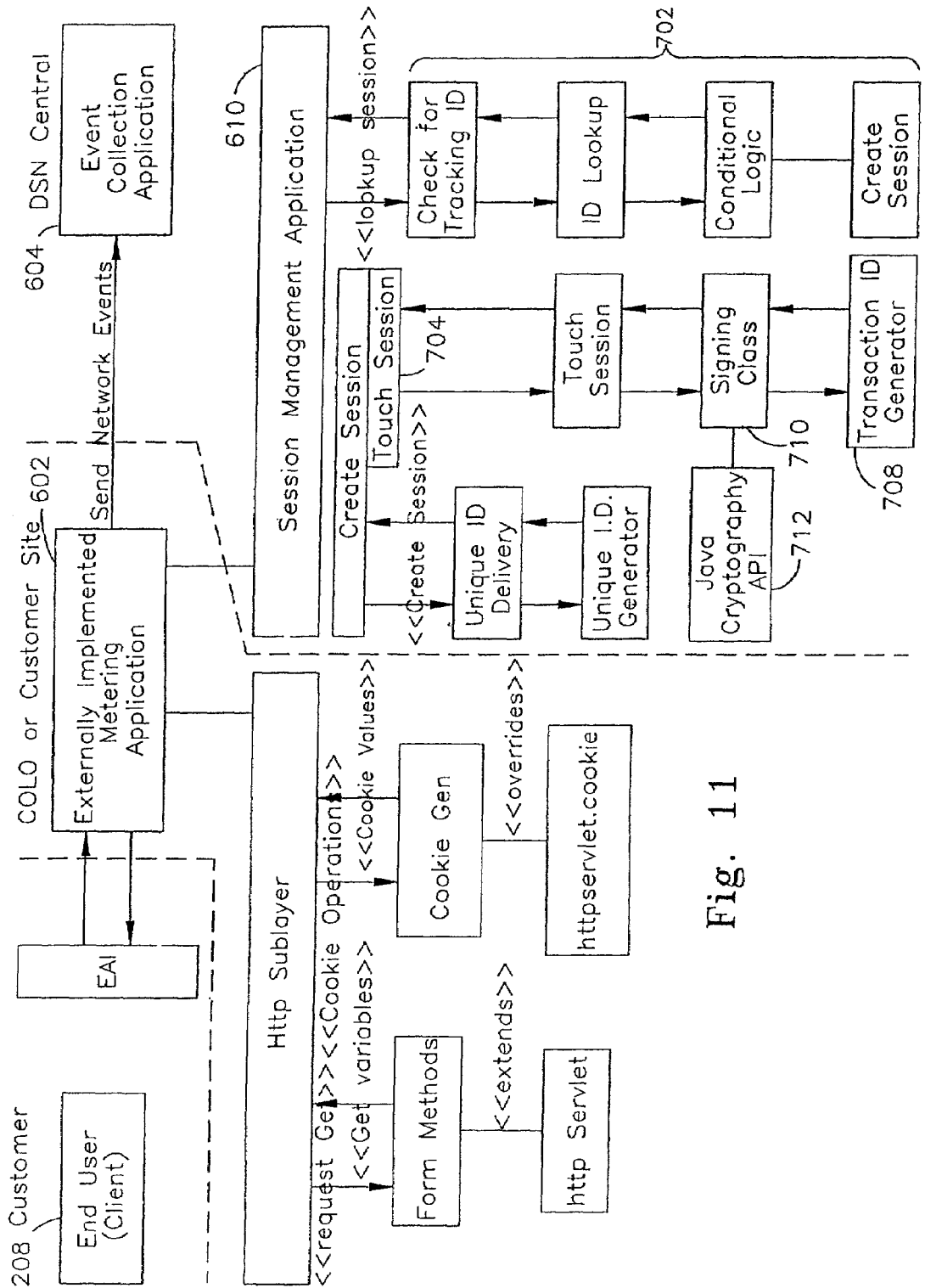
FIG. 11 illustrates a session management application designed for an enterprise application software approach.

Referring to FIG. 7, in a centralized eCommerce approach, the session management application 610 is hosted in a central location. Requests from different business partners are sent to the central session manager. Network events are generated and forwarded to the metering application 602. Referring to FIG. 8, in a distributed eCommerce approach, the network events are generated at end user 208 or collocated site. These systems will generate events for a specific business partner or contract. Referring to FIG. 9, in the mobile commerce approach, the metering applications 602 are deployed centrally. As illustrated in FIG. 10, the monitoring client/server approach requires that the system generating the network events implement the session management APIs so that it can get session IDs and transaction IDs. Finally, as illustrated in FIG. 11, an enterprise application integration approach provides software to integrate data and functionality in disparate software systems.

Figure 12:
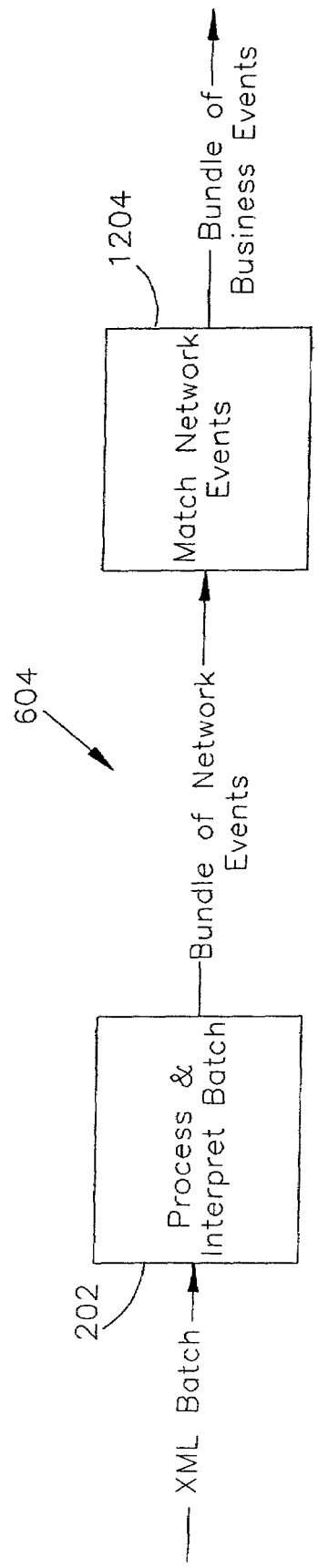
FIG. 12 illustrates a preferred events collection application.

Referring to FIG. 12, the preferred events collection application 604 is responsible for processing and interpreting batches of events and matching network events. A process and interpret batch module 1202 of the preferred events collection application 604 is responsible for: receiving a batch of network events from multiple metering applications 602, which is done, preferentially, using an XML file format; archiving the batches; creating network event objects from the XML batch; and validating the batch and included network events. A match network events module 1204 of the events collection application 604 is preferentially responsible for: matching network events to one another and to a contract clause; creating business events; and sending bundles of business events on to conditioning and settlements.

Figure 13:
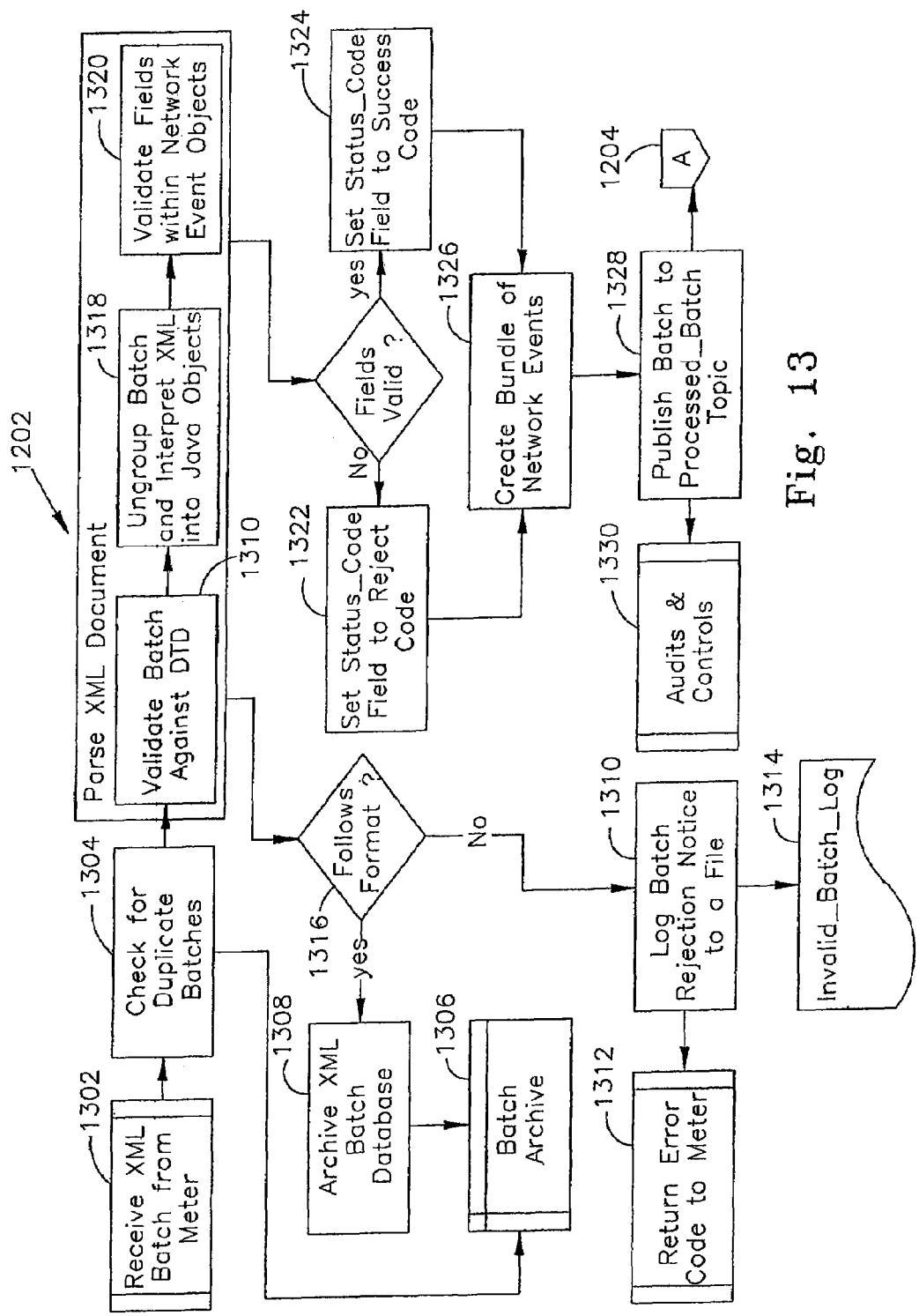
FIG. 13 illustrates the preferred process steps performed by the process and interpret batch module of the events collection application.

A preferred embodiment of the steps performed by the process and interpret batch module 1202 are illustrated in FIG. 13. The process and interpret batch module 1202 receives the XML batch from the metering application 602 at step 1302. First, the process and interpret batch module 1202 checks for duplicate batches at step 1304. If a duplicate batch is detected, it is archived by a batch archive application 1306 in a batch archive database 1308.

After a check is made for duplicate batches, the records within the batch are validated against a document type definition (DTD) to determine if the records are structured correctly at step 1310. This step does not validate the values within records. If a record does not meet the predetermined XML format, the entire batch must be rejected. If the batch is rejected, information about that batch (not the entire batch) and the status of rejection is logged using a logging facility 1310. Also, an error containing information about that batch is also preferentially sent to the metering application 602 at step 1312. This processing should preferably be done synchronously. An invalid batch log 1314 keeps track of the invalid batches during operation.

If the batch passes validation, the batch is preferentially archived by step 1316. Initially, the batch will be archived on line so that users can search that data. However, after a predefined amount of time, batch data will be moved to a more permanent archive. If the batch passes validation and is archived, the next step is to turn the records within the XML document into network event objects at step 1318. During this step, objects will be constructed based on their network event code and the data provided in the XML batch will be used to populate the objects. To populate the Gateway_DT, a system timestamp is taken when the XML parsing is initiated. This same timestamp will be used to populate all Gateway_DT fields for every network event within the batch.

At step 1320, the actual values that are provided within the fields are preferentially validated three ways: to ensure correct values, format and structure; to determine if there should be any dependencies on other fields (cross-field validation); and to determine if certain reference data should exist (referential validation). A network event code is used to determine differing validation strategies for each network event type. Validation upon optional fields also depends on the network event code, and on the values within those optional fields. A further level of validation will be applied by firing the rules engine, which is detailed below. Doing so would determine if a network event could potentially be matched to an existing contract clause, without checking to see if it could match to another network event. This level of validation ensures that no network events will be sent to the matching pool that are destined for failure, and will, with certainty, end up being an unrealized events topic.

If a network event object is rejected, a status code is set to reject at step 1322. The rejection code should indicate which validation scheme it failed and the type of validation it failed, e.g., invalid data type. If a network event object passes all of the validation schemes, the status code is set to success at step 1324. Regardless of whether the network event object passes all of the validation schemes, a bundle of network events are created, which is illustrated at step 1326. At this step, all of the network event objects that came in within the same batch are recreated into a bundle of network event objects that are now either rejected or accepted.

The bundle created above is then published to a processed batches topic that will publish the event objects to both an audits and controls application 1330, and the match network events module 1204. The audits and controls application 1330 will store metadata and object data for valid (success) event objects and only metadata for rejected event objects. It is up to the match network events module 1204 to determine which event objects are valid in the bundles and only send those to a matching pool.

Figure 14:
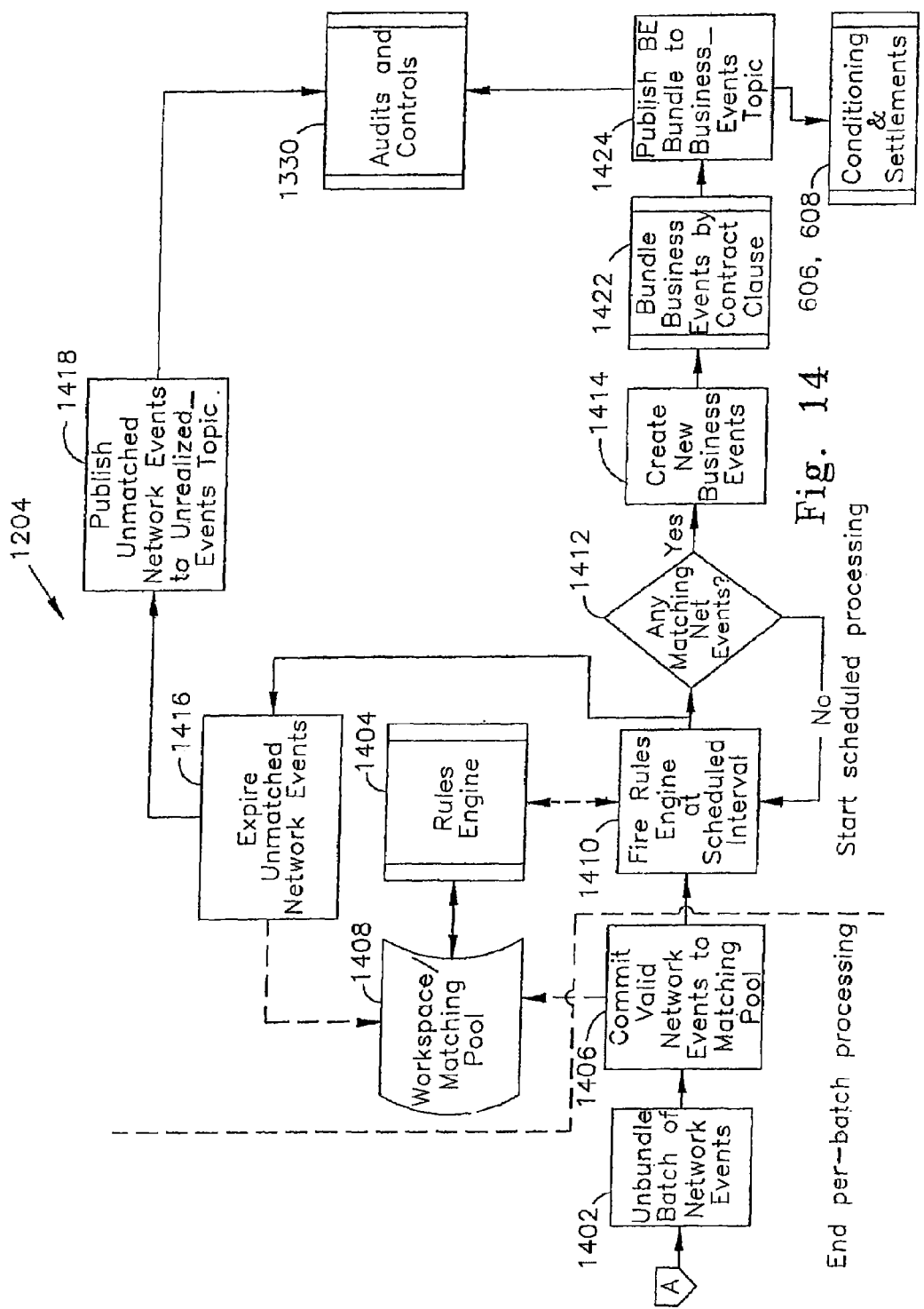
FIG. 14 illustrates the preferred process steps performed by the match network events module of the events collection application.

Referring to FIG. 14 as set forth above, before being published to the processed batch topic, network events are bundled together with the other network events from their original batch at step 1326. As such, at step 1402 the preferred match network events module 1204 unbundles the batches of network events. When the match network events module 1204 receives the message (which contains the batch of network events), it also preferentially evaluates each network event one at a time to determine which ones are valid. During validation, each network event is populated with a status code, which indicates the degree of success or failure for each. Since only valid network events should continue through the pipeline, the status code field is used to determine whether or not to send a network event on to a rules engine application 1404, which is accomplished at step 1306.

Invalid network events are discarded and will no longer exist within the pipeline, although their existence has been recorded by the audits and controls application 1330. Preferentially, the process of submitting network events to a matching pool 1408 represents the last action that the system performs on a per-batch basis. Prior to this point, every task performed in the events collection application 604 has been accomplished on a per-batch schedule, whereas every task after this point preferentially is done on a configurable scheduled interval.

A scheduled process will initiate the 'firing' of the rules engine 1404 at configurable intervals at step 1410. This process means that the match network event module 1204 invokes all rules sets that have been configured within the rules engine 1404. The rules engine 1404 applies business logic to the network events. This includes strategies to match correlating network events to one another, strategies to apply those matched network events to a specific contract clause, and other system-level logic used for, among other things, expiring unmatched network events.

The rules engine 1404 simultaneously evaluates every network event that has been submitted to the matching pool 1408. Leveraging templates, each contract component will have a specific rule that is applied to network events that match and meet a respective contract clause's criteria, which is accomplished at step 1412. When a network event satisfies the criteria for a contract clause's rules, it is matched with any other matching network events satisfying the criteria, and they are merged to form a new business event at step 1414. During execution of the rules, if it is determined that a business event should be created, then a business event is created.

The matching pool 1408 can be wholly maintained and accessed by the rules engine 1404, or maintained by a predefined persistence component such as Toplink and WebLogic. Network events are preferentially submitted to the matching pool 1408 through an API. The rules engine 1404 is able to fire its rules upon as many stored network events as is deemed necessary, as opposed to the most recently submitted batch. An expire unmatched network events process, at step 1316, is a rule set that applies expiration logic to all network events when the rules are fired. Network events will likely be expired consistently based upon network event type and, when expired, will be returned to the matching network events module 1204 for publication to an unrealized events JMS topic. Expired network events can be returned to the matching network events module 1204 where they are evaluated to determine if they had been matched to a contract clause. If not, they are published to the unrealized events JMS topic at step 1418 so that the audits and controls application 1330 will have record of all unrealized network events.

As previously set forth, when network events have been matched to a contract clause and to each other, then a business event is created at step 1414. The business event will, preferentially, be a new instantiation of a Java object, whose attributes are populated from the attributes of the network events that are merged to create them. The business events are a singular class, whose attributes may or may not be utilized, depending on the type of business event that is represented by the instance. Optional fields that are required for the business event type, but not populated, will be populated with a default value during conditioning.

Preferentially, the matching network events module 1204 generates a collection of like business events, and batches them together before sending that collection to a bundle producer at step 1422. The bundle producer accepts a collection of like business events and creates distinct bundles based upon the contract clause to which the business event has been matched. When a particular bundle reaches a predetermined size (the maximum count of business events per bundle, which is configurable for performance adjustments), the bundle is published to a business events JMS topic at step 1424. Bundles of business events, which all correlate to the same contract clause, will be published to the business events JMS topic. This topic has three subscribers: the conditioning application 606, the settlements application 608 and the audits and controls application 1330, which are illustrated in FIG. 14.

Figure 15:
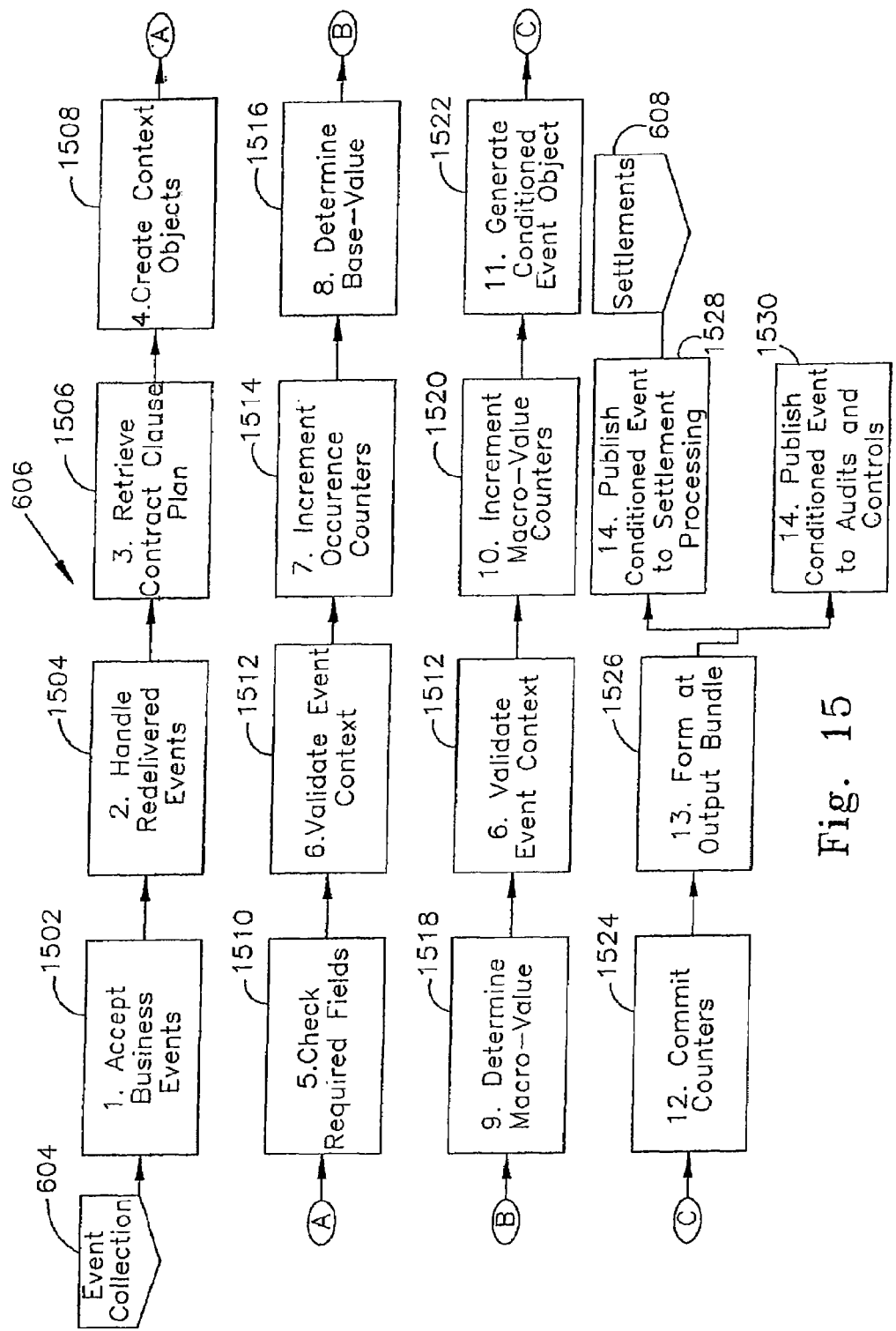
FIG. 15 illustrates a preferred conditioning application.

Referring to FIG. 15, the conditioning application 606 is responsible for applying valuation information to business events as required for settlements processing. During operation, the conditioning application 606 accepts ordered event bundles from the event collection application 604 and interprets their component business events according to a defined contract clause. The conditioning application 606 will apply a base value to each business event upon completing execution of applicable base-value determination activities defined within a respective contract clause. Any application modifiers (i.e., discounts, promotions or threshold variables) will then be applied to the base value, resulting in a macro value. Finally, a conditioned event will be generated and published to the settlements processing application 608 and the audits and controls application 1330.

During operation, at step 1502, the conditioning processing application 606 will receive bundles of business events from the event collection application 604. Conditioning will receive bundles of like business events from the business event topic 1324 (all events in a bundle will preferentially be sorted by date, and each bundle will apply to one particular contract clause). These bundles will preferentially also be grouped by a contract clause ID.

The next step involved in conditioning is handling redelivered events, which is illustrated at step 1504. This step will check a redelivered flag of the bundle of business events accepted. If the flag is TRUE, then the bundle will be passed to a dedicated error file. If the flag is FALSE, then the bundle will be passed to a retrieve contract clause plan step 1506. This process is necessary to prevent errors in processing if an application server crashes while sending a message from the business event topic to conditioning. Here, the first bundle processed after the server is recovered could be a duplicate bundle, and would thus adversely affect processing results.

As briefly outlined above, the retrieve contract clause plan step 1506 is designed to retrieve the appropriate contract as it relates to a business event. Using the contract clause ID, the conditioning application 606 will retrieve the appropriate contract clause plan. Activities will execute according to this contract clause plan. The step is necessary to provide processing components with specific rules and directions for processing particular events. Once the appropriate contract clause plan has been retrieved, the conditioning application 606 will generate an event context object at step 1508 to hold conditioned event attributes that are altered during the conditioning process, and reference data needed to condition a particular business event. The create context objects module 1508 is necessary to provide a workspace to hold interim values for dynamic attributes during the conditioning process, as the attributes within the business events themselves will be immutable (i.e., not subject to alteration with processing cycles).

A check required fields module will identify the minimum set of business event attributes required for conditioning an event of the type in question at step 1510. An additional set of customer required fields for each particular business event will be defined by a customer within a contract clause (implicitly, as value determination activities are defined within that clause). The set of system and customer required fields for each business event type is defined in an events definition table. If the minimum set of business event attributes is fulfilled by the business event, then that business event will be passed to a validate event context module, which is represented at step 1512. If the minimum set of business event attributes is not fulfilled by the business event, an acquire missing data routine will attempt to fill missing required business event attribute fields with appropriate values from internal or external sources. If the acquire missing data activity succeeds, then the business event will be passed to the validate event context activity. If acquire missing data activity fails, then the business event will be passed to a dedicated error file. The check required fields activity is necessary to ensure that processing does not occur on events for which a macro value cannot be determined and to ensure that processing does not produce incorrect or fraudulent macro values.

Each business event attribute within a particular business event will be validated against a predefined standard, defined value (required) and a customer-defined value (optional) for each particular business event type at step 1512. The validate event context module will compare each business event attribute within a particular business event against acceptable values listed in validation strategies tables. If the validate event context activity succeeds, then the business event will be passed to the increment occurrence counters represented by step 1514. If the validate event context activity fails, then the business event will be passed to a dedicated error file. The validate event context module is performed to ensure that processing does not occur on events for which a macro value cannot be determined and to ensure that processing does not produce incorrect or fraudulent macro values.

An occurrence counter will keep a count that represents the total number of occurrences of all events that pass through the system meeting specified criteria. Conditioning occurrence counters will be unique to the conditioning application 606 (i.e., if conditioning and-settlements processing both rely on an identical counter for processing, each will have a unique copy of that counter defined locally—there will not be cross-module counter comparisons). Each event will be evaluated against a history table to see if it has already incremented the appropriate occurrence counters (this is necessary in case a bundle is dropped before fully processing within a module). If the event has not already incremented its appropriate counters, it will then increment each by quantity at step 1514. In the conditioning application 606, occurrence counters will function at the contract clause level. Contract clause level counters will be defined with respect to specific business event attributes, and will preferentially apply to time periods "since origin" and "last x days." The counts from these counters will serve as identifiers for base-value and macro-value determination activities.

The increment occurrence counter activities defined in the contract clause plan will execute appropriately to set occurrence counts for processing. Each increment occurrence counter activity will contain a selector and an action. Each increment occurrence counter activity's action will be executed when its associated selector evaluates to TRUE. Selectors will be defined in terms of identifiers (the part of the selector that is being compared), literals (the expression values that are hard-coded into the selector), comparison operators (that compare identifiers to literals in a Boolean expression that evaluates to either TRUE or FALSE), and arithmetic operators (comparison operators to calculate values dynamically at run time). Any business event attribute that exists within the business event or the context object can serve as an identifier for incrementing occurrence counters. Identifiers will be explicitly set by customers when a contract clause is created. Literals will be explicitly defined and set by customers when a contract clause is created (reference data). Comparison operators will be configured by customers when a contract clause is created and arithmetic operators will be configured by customers when a contract clause is created.

A determine base-value activity is defined in the contract clause plan and will execute appropriately to determine a base value for a particular business event at step 1516. Each activity will contain a selector and an action. Preferentially, each activity's action will be executed when its associated selector evaluates to TRUE. Selectors will be defined in terms of identifiers (the part of the selector that is being compared), literals (the expression values that are hard-coded into the selector), comparison operators (that compare identifiers to literals in a Boolean expression that evaluates to either TRUE or FALSE), and arithmetic operators (comparison operators to calculate values dynamically at run time).

Any business event attribute that exists within the business event object or any occurrence count can serve as an identifier for processing. Business event attributes of type "path" can be structured to allow for hierarchical defaults. Identifiers will be explicitly set by customers when a contract clause is created. Literals will be explicitly defined and set by customers when a contract clause is created (reference data). Comparison operators will be configured by customers when a contract clause is created, and arithmetic operators will also be configured by customers when a contract clause is created. Activity actions will be configured, and literals defined and set, by customers when a contract clause is created.

A determine macro-value activity is performed at step 1518. These activities are defined in the contract clause plan and will execute appropriately to determine a macro value from a previously derived base value for a particular business event. Preferentially, each activity will contain a selector and an action. Each activity's action will be executed when its associated selector evaluates to TRUE. Selectors will be defined in terms of identifiers (the part of the selector that is being compared), literals (the expression values that are hard-coded into the selector), comparison operators (that compare identifiers to literals in a Boolean expression that evaluates to either TRUE or FALSE), and arithmetic operators (comparison operators to calculate values dynamically at run time).

Any business event attribute that exists within the business event or any occurrence count can serve as an identifier for processing. Business event attributes of type "path" can be structured to allow for hierarchical defaults. Identifiers will be explicitly set by customers when a contract clause is created. Literals will be explicitly defined and set by customers when a contract clause is created. Comparison operators will be configured by customers when a contract clause is created and activity actions will be configured, and literals defined and set, by customers when a contract clause is created. The determine macro-value activity 1518 is necessary to allow for modifications to event valuation information (i.e., discounts, promotions, or threshold variables) and finalize these conditioned values for settlement processing.

A macro-value counter will keep a count that represents the total sum of macro values for all events that pass through the system meeting specified criteria at step 1522. Macro-value counters will only be used within the conditioning application 606. Each event will be evaluated against a history table to see if it has already incremented the appropriate macro-value counters (this is necessary in case a bundle is dropped before fully processing within a module). If the event has not already incremented its appropriate counters, it will then increment each by macro value. Macro-value counters will function at the contract clause level. Contract clause level counters will be defined with respect to specific business event attributes, and will apply to time periods "since origin" and "last x days." The increment macro-value counter activities 1520 defined in the contract clause plan will execute appropriately to set macro-value counts for processing. Each increment macro-value counter activity will contain a selector and an action. Preferentially, each increment macro-value counter activity's action will be executed when its associated selector evaluates to TRUE as with other descriptions set forth herein. The increment macro-value counters activity 1520 is necessary to define the macro-value counts that will be used for macro-value determination processes for appropriate subsequent events.

The conditioning application 606 will create a conditioned event object at step 1522 from the information contained within the business event and the event context object when all activities have been completed for a particular business event. The data fields contained within the conditioned event object are listed in a predefined definition table. The generate conditioned event object activity 1522 is necessary to finalize, and make permanent, conditioning date for settlements processing. The conditioning application 606 will update and commit the occurrence and macro-value counters at step 1524 to a database when the final business event within a bundle completes step 1522. The commit statistics counters activity 1524 is necessary to ensure that counts are not double-counted in cases where a bundle must be reprocessed (system shut-down).

A format output bundle activity 1526 will hold all conditioned events for a determined amount of time, sort them by date, and bundle all of the conditioned event objects by contract clause ID and add any metadata needed to identify the bundle. The format output bundle activity 1526 is necessary to format the group of conditioned events, which will be used by the settlements processing application 608. Finally, at step 1528, the bundle of conditioned event objects are published to a conditioned events topic, which is then sent to the settlements processing application 608. A copy of the conditioned event bundle will also be published to the audit and controls application 1330, at step 1530.

Figure 16:
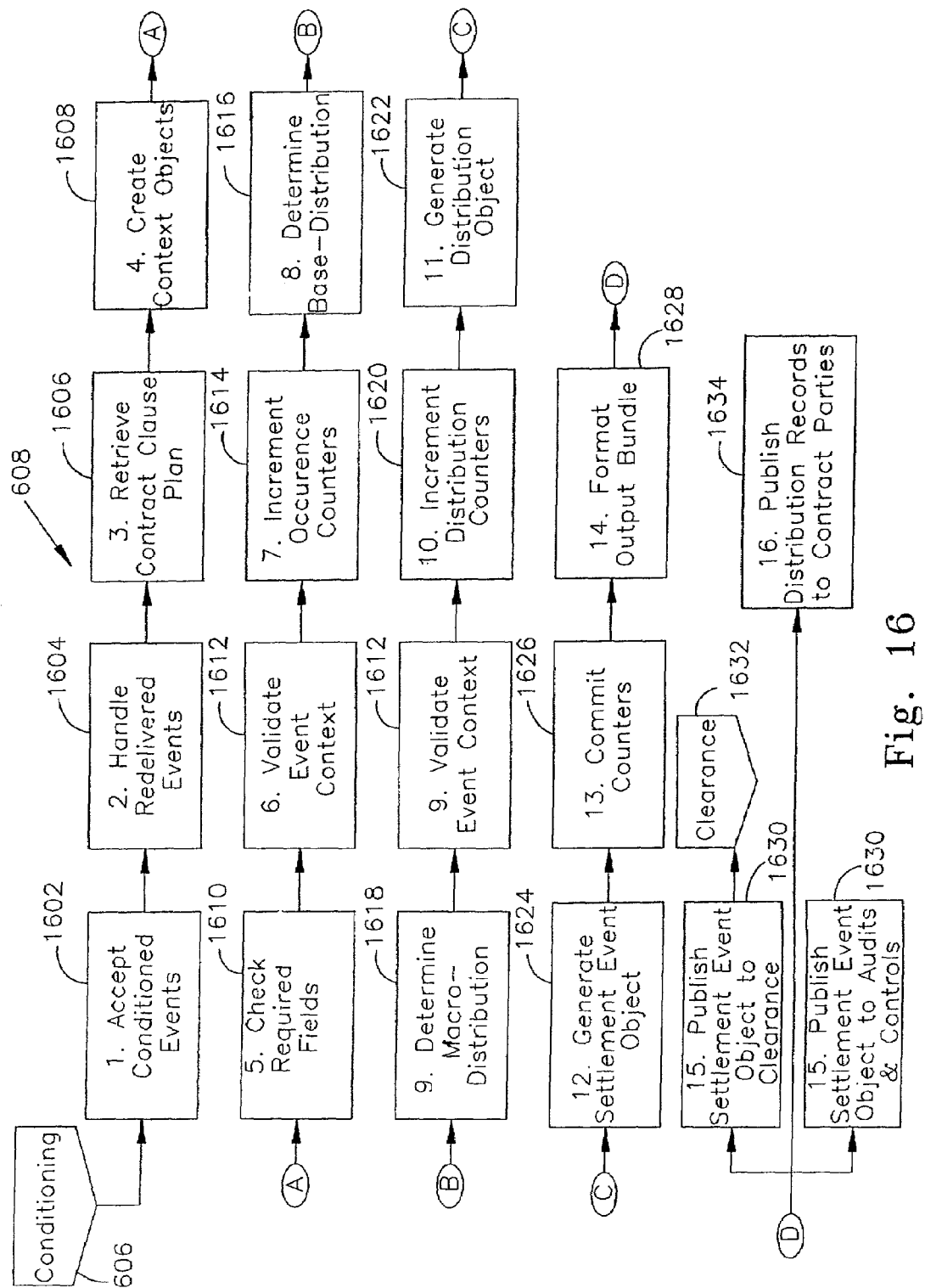
FIG. 16 illustrates a preferred settlements application.

Referring to FIG. 16, the settlements processing application 608 determines settlement distribution, by party, for payment clearance and reporting purposes. The settlement processing application 608 will accept conditioned events from the conditioning application 606 and interpret them according to a defined contract clause. The settlement processing application 608 can execute distribution algorithms to determine a base distribution for each party designated within the contract clause. Any applicable modifiers (i.e., discounts, promotions, or threshold variables) can then be applied to each base distribution, resulting in a macro distribution. Finally, a distribution object is created for each party, and a settlement event is created to hold all distributions objects relating to a specific conditioned event. This settlement event is published to a clearance application and the audits and controls application 1330. Settlement distribution records can also be sent to parties at their request (for internal accounting, billing, and reconciliation purposes).

During operation, the settlement processing application 608 will receive bundles of like conditioned events from the conditioned event topic (all events in a bundle will be sorted by date, and each bundle will apply to one particular contract clause). Preferentially, these bundles will be grouped by contract clause ID. Referring to FIG. 15, the step of accepting conditioned events from the conditioning application 606 is illustrated at step 1602.

The preferred settlement processing application 608 also includes a routine that handles redelivered events, which is illustrated at step 1604. The redelivered handler routine preferentially checks the redelivered flag of the bundle of conditioned events accepted. If the flag is TRUE, then the bundle is passed to a dedicated error file. If the flag is FALSE, then the bundle will be passed to the retrieve contract clause plan step 1606. The handle redelivered events activity 1604 is necessary to prevent errors in processing if an application server crashes while sending a message from the conditioned event topic to settlements. Here, the first bundle processed after the server is recovered could be a duplicate bundle, and would thus adversely affect processing results.

Using the contract clause ID at step 1606, the settlement processing application 608 retrieves the appropriate contract clause plan. Activities will execute according to this contract clause plan. The retrieve contract clause plan activity 1606 is necessary to provide processing components with specific rules and directions for processing particular events.

The settlements processing application 608 preferentially also creates context objects at step 1608. Settlements generates a distribution context object for each distribution party (specified in contract clause) to hold conditioned event attributes that are altered during the distribution calculation process. These distribution context objects will also contain reference data needed to settle a particular conditioned event. The create context objects activity 1608 is necessary to provide a workspace to hold interim values for dynamic attributes during the settlements process, as the attributes within the conditioned events themselves will be immutable (i.e., not subject to alteration within processing cycles).

A check required fields activity 1610 identifies the minimum set of conditioned event attributes required for settling an event of the type in question. An additional set of customer required fields for each particular conditioned event will be defined by a customer with a contract clause (implicitly, as distribution determination activities are defined within that clause). The set of system and customer required fields fro each conditioned event type is preferentially defined in an events definition table.

If the minimum set of conditioned event attributes is fulfilled by the conditioned event, then that conditioned event is passed to a validate event context activity 1612. If the minimum set of conditioned event attributes is not fulfilled by the conditioned event, then an acquire missing data activity will attempt to fill missing required conditioned event attribute fields with appropriate values from internal or external sources. If the acquire missing data activity succeeds, then the conditioned event will be passed to the validate event context activity. If the acquire missing data activity fails, then the conditioned event will be passed to a dedicated error file. The check required fields activity 1510 is necessary to ensure that processing does not occur on events for which a macro distribution cannot be determined and to ensure that processing does not produce incorrect or fraudulent macro distributions.

Each conditioned event attribute within a particular conditioned event will be validated against a predefined standard, which may include a defined value (required) and a customer-defined value (optional) for that conditioned event type. A validate event context activity 1612 compares each conditioned event attribute within a particular conditioned event against acceptable values listed in validation strategies tables. If the validate event context activity 1612 succeeds, then the conditioned event will be passed to the increment occurrence counters step 1614. If validate event context activity fails, then the conditioned event will be passed to a dedicated error file. Base-distribution validation and macro-distribution validation will occur after base-distribution determination activities and macro-distribution determination activities have been completed for a particular conditioned event (respectively). The validate event context activity 1612 is necessary to ensure that processing does not occur on events for which a macro-distribution cannot be determined and to ensure that processing does not produce incorrect or fraudulent macro distributions.

In the preferred embodiment, an occurrence counter 1614 keeps a count that represents the total number of occurrences of all events that pass through the system meeting specified criteria. Settlements processing occurrence counters will be unique to the settlements processing application 608 (i.e., if conditioning and settlements processing both rely on an identical counter for processing, each will have a unique copy of that counter defined locally—there will be no cross-module counter comparisons). Each event will be evaluated against a history table to see if it has already incremented the appropriate occurrence counters (this is necessary in case a bundle is dropped before fully processing within a module). If the event has not already incremented its appropriate counters, it will then increment each by quantity at step 1614. Within the settlement processing application 068, occurrence counters will function at the contract and contract clause levels. Contract clause level counters will be defined with respect to specific business event attributes, and will apply to time periods "since origin" and "last x days." The counts from these counters will serve as identifiers for base-distribution and macro-distribution determination activities.

The increment occurrence counter activities 1614 defined in the contract clause plan will execute appropriately to set occurrence counts fro processing. Each increment occurrence counter activity 1614 contains a selector and an action. Each increment occurrence counter activity's action will be executed when its associated selector evaluates to TRUE. Selectors will be defined in terms of identifiers (the part of the selector that is being compared), literals (the expression values that are hard-coded into the selector), comparison operators (that compare identifiers to literals in a Boolean expression that evaluates to either TRUE or FALSE), and arithmetic operators (comparison operators to calculate values dynamically at run time). Any conditioned event attribute that exists within the conditioned event or the event context object can serve as an identifier for incrementing occurrence counters. Conditioned event attributes of type "path" can be structured to allow for hierarchical defaults. The remaining features are the same as previously described with respect to other similar steps.

A determine base-distribution step 1616 defined in the contract clause plan will execute appropriate to determine a base distribution for a particular distribution object. Each activity will contain a selector and an action. Each activity's action will be executed when its associated selector evaluates to TRUE. Selectors will be defined in terms of identifiers (the part of the selector that is being compared), literals (the expression values that are hard-coded into the selector), comparison operators (that compare identifiers to literals in a Boolean expression that evaluates to either TRUE or FALSE), and arithmetic operators (comparison operators to calculate values dynamically at run time). The remaining features are the same as previously described in other similar processing steps.

Referring to FIG. 16, a determine macro-distribution step 1618 defined in the contract clause plan will execute appropriately to determine a macro distribution from a previously derived base distribution, for a particular distribution object. Each activity will contact a selector and an action. Each activity's action will be executed when its associated selector evaluates to TRUE. The remaining features of this step are the same as described for other similar steps.

The next step in the preferred settlements processing application 608 is to increment distribution counter 1620. A distribution counter will keep a count that represents the total distributions for all events that pass through the system meeting specified criteria. Distribution counters will be unique to settlements processing. Each event will be evaluated against a history table to see if it has already incremented the appropriate distribution counters (this is necessary in case a bundle is dropped before fully processing within a module). If the event has not already incremented its appropriate counters, it will then increment each by distribution. Within settlements processing, distribution counters will function at the contract and contract clause levels. Contract clause level counters will be defined with respect to specific business event attributes, and will apply to time periods "since origin" and "last x days." The counts from these counters will serve as identifiers for base-distribution and macro-distribution determination activities. The remaining features of this step are similar to those discussed with respect to other steps disclosed herein Settlements will create a distribution object 1622 from information contained within the conditioned event and the distribution context object when all distribution activities have been completed for a particular distribution. The data fields contained within the distribution object are contained in an events definition table. The generate distribution object activity 1622 is necessary to finalize, and make permanent, distribution objects for insertion into settlement event objects.

Settlements will create a settlements event object at step 1624 from information contained within the conditioned event when all activities have been completed for a particular conditioned event. This settlement event object will also contain all of the distribution objects that have been created for that conditioned event. The data fields contained within the conditioned event object are located in an events definition table. The generate settlement event object activity 1624 is necessary to finalize, and make permanent, settlement event objects for clearance.

At step 1626, the settlement processing-application 608 will update and commit the occurrence and distribution counters to the database when the final conditioned event within a bundle completes the generate settlement event object step 1622. The commit counters activity 1626 is necessary to ensure that counts are not double-counted in cases where a bundle must be reprocessed (system shut-down).

A format output bundle activity is illustrated at step 1628 and will bundle all of the settlement event objects by contract clause ID and add any metadata needed to identify the bundle. The format output bundle activity 1628 is necessary to format the group of settlement events, which will be used by the clearance application to produce financial reports for customers of the system.

The settlement processing application 608 will publish the bundle to a settlement events topic 1630, which is sent to the clearance application 1632. A copy of the settlement event will also be published to the audit and controls application 1330. At step 1634, the settlement processing application 608 will create customer-defined distribution records, which will be sent to the contract party or stored for contract parties for reviewing at their request (for internal accounting, billing, and reconciliation purposes).

While the invention has been described with respect to specific examples including presently preferred modes of carrying out the invention, those skilled in the art will appreciate that there are numerous variations and permutations of the above described systems and techniques that will fall within the spirit and scope of the invention as set forth in the appended claims.

What is claimed is:

1. A method of tracking network events, comprising:
storing in a database a plurality of rules corresponding to a plurality of contractually predefined clauses corresponding to a contract between at least two of a plurality of service providers and an entity other than an end user, the plurality of service providers comprising a first service provider and a second service provider;
monitoring with a tracking computer a plurality of network events conducted across a plurality of different platforms comprising a first platform and a second platform, the network events transmittable by the first service provider and the second service provider that are separately operable on the first platform and the second platform, respectively, the first platform and the second platform each comprising only one of an internet platform, a cable platform, or a satellite communications platform, the first platform and the second platform being different platforms;
the plurality of network events representative of a plurality of electronic transmissions and a plurality of non-electronic transactions comprising one of advertisements, products, or services for receipt, by end users;
identifying, with the tracking computer, from among the plurality of network events, only those network events that match the contractually predefined clauses corresponding to the contract between the at least two of the plurality of service providers and the entity;
matching the identified network events that satisfy a criteria of a respective at least one of the contractually predefined clauses to at least one of the plurality of rules stored in the database corresponding to at least one of the contractually predefined clauses to create a business event; and applying valuation information to the business event based on the at least one of the contractually predefined clauses matched to the corresponding identified network events.

2. The method according to claim 1, further comprising:
where the contract is between at least two of the plurality of service providers and the entity;
processing the identified network events according to the contractually predefined clauses matched to the identified network events and the applied valuation information to identify contractual obligations of the at least two of the plurality of service providers, and the entity;
creating, with a bundle producer, a distinct bundle of similar business events based on the at least one of the contractually predefined clauses of the contract being matched to the corresponding business event; and
receiving the distinct bundle with a conditioning application.

3. The method according to claim 1, wherein matching further comprises determining that a predetermined criteria is satisfied by application of a respective specific rule corresponding to a respective at least one of the contractually predefined clauses to the at least one of the identified network events.

4. The method according to claim 1,
where the contract is between at least two of the plurality of service providers and the entity; and
wherein the business event is selected from the group consisting of an internet platform based event, a cable platform based event, satellite communications platform based event, and a combination of any two or more of the internet platform based event, cable platform based event, and satellite platform based event.

5. The method according to claim 1,
where the contract is between at least two of the plurality of service providers and the entity; and
wherein identifying, with the tracking computer, from among the plurality of network events further comprises identifying only those network events conducted by the at least two of the plurality of service providers to the end users.

6. The method according to claim 1, wherein identifying, with the tracking computer, from among the plurality of network events comprises identifying groups of network events that occur as part of a single end user session.

7. The method according to claim 1, further comprising creating the contractually predefined clauses corresponding to the contract to track and report network events specific to fulfillment of contractual obligations, the plurality of service providers further comprising a third service provider, wherein the third service provider creates at least one of the contractually predefined clauses corresponding to the contract.

8. The method according to claim 1, wherein at least one of the contractually predefined clauses comprises pricing parameters.

9. The method according to claim 1, wherein monitoring further comprises receiving an identification of each of the plurality of service providers that transmitted at least one of the plurality of network events and an identification of the end user associated with the transmitted at least one of the plurality of network events.

10. The method according to claim 1, further comprising:
receiving bundles of similarly conditioned event objects with a settlement processing application, wherein the similarly conditioned event objects are generated from information contained within the business event with a conditioning application; and
receiving events from an event collection application, from the conditioning application, and from the settlement processing application with an audits and controls application.

11. The method according to claim 1, further comprising:
where the contract is between at least two of the plurality of service providers and the entity; and
determining a settlement between the at least two of the service providers and the entity based on the valuation information, the business event, and the contractually predefined clauses that are matched to corresponding identified network events.

12. The method according to claim 1, wherein the network events include the transmission, by the first service provider or the second service provider, of advertisements to end users that are not a party to the contract, and wherein applying valuation information further comprises checking a redelivered flag of a bundle of similarly conditioned business events.

13. The method according to claim 1, wherein the network events representative of the plurality of electronic transmissions of advertisements, products, or services comprise the transmission, by the first service provider or the second service provider, of electronic products to end users that are not a party to the contract, wherein the plurality of electronic transmissions that are transmittable include a graphical information format file that identifies the electronic products being transmitted.

14. The method according to claim 1, wherein at least one of the plurality of network events is representative of non-electronic transactions, by at least one of the plurality of service providers, of advertisements to end users that are not a party to the contract.

15. The method of claim 1, wherein applying valuation information further comprises:
checking a redelivered flag of a bundle of similar business events;
comparing at least one business attribute of at least one of the similar business events against pre-determined values listed in a validation strategies table;
applying a base-value to each of the similar business events upon completion of execution of base-value determination activities defined within the at least one of the contractually predefined clauses;
applying one or more modifiers to the base-value to obtain a macro value for each of the similar business events;
updating a macro value counter stored in the database, wherein the macro value counter is configured to keep a count that represents a total sum of a plurality of macro values of the similar business events; and
determining settlement amounts between at least one of the participating service providers and the entity based on the valuation information, the similar business events and the contractually predefined clauses that are matched to corresponding identified network events.

16. The method according to claim 8, wherein at least one of the contractually defined clauses further comprises settlement parameters.

17. A system for tracking network events, the system comprising:
a tracking computer configured to receive network event information from a first service provider operable on a first platform and a second service provider operable on a second platform, the first platform and the second platform each comprising only one of an internet platform, a cable platform, or a satellite communications platform, the first platform and the second platform being different platforms;

the tracking computer further configured to execute computer-executable instructions to monitor network events conducted across the first platform and the second platform that are transmittable for receipt by end users, the network events representative of a plurality of electronic transmissions and a plurality of non-electronic transactions;

the tracking computer further configured to execute computer-executable instructions to match the monitored network events that are conducted across the first platform and the second platform, in accordance with a contract, to at least one of a plurality of contract clauses included in the contract based on the information included in the network event, the contract between the first service provider and the second service provider, and an entity other than an end user; and the tracking computer further configured to execute computer-executable instructions to interpret the monitored network events that are matched to the contract clauses to identify contractual obligations of the first service provider and the second service provider, and the entity;

the tracking computer comprising a memory that stores the executable instructions; and the tracking computer further comprising a processor coupled to the memory configured to execute the computer-executable instructions stored in memory.

18. The system of claim 17, wherein the tracking computer is further configured to determine settlement distributions payable by the entity to either the first service provider or the second service provider, or a combination thereof, based on the identified contractual obligations, and the monitored network events that are matched to the contract clauses.

19. The system of claim 17, wherein the tracking computer further configured to execute computer-executable instructions to match the monitored network events that are conducted across the first platform and the second platform is further configured to evaluate each of the monitored network events to identify one of the monitored network events that satisfies a criteria of a rule corresponding to at least one of the contract clauses, and match the one of the monitored network events that satisfies the criteria to the contract clause.

20. The system of claim 17, wherein the tracking computer further configured to execute computer-executable instructions to interpret the monitored network events is further configured to process the monitored network events according to the contract clauses that are matched thereto in order to generate a plurality of business events, the tracking computer further configured to execute computer-executable instructions to interpret the monitored network events further configured to batch the business events into distinct bundles of similar business events that are matched to a contract clause in a contract;

the tracking computer further configured to execute computer-executable instructions to interpret the monitored network events further configured to group the batch of business events by a contract clause ID indicative of the contract clause; and the tracking computer further configured to execute computer-executable instructions to receive the distinct bundles of similar business events.

21. The system according to claim 17, the tracking computer further configured to execute computer-executable instructions to monitor network events conducted across the first platform and the second platform is further configured to monitor for the network events representative of the electronic transmissions and the non-electronic transactions, the electronic transmissions and the non-electronic transactions comprising one of advertisements, products, or services provided by at least one of the first service provider and the second service provider for receipt, by the end user that is not a party to the contract.

22. The system of claim 19, wherein the tracking computer further configured to execute computer-executable instructions to match the one of the monitored network events that satisfies the criteria to the contract clause is further configured to match the one of the monitored network events that satisfies the criteria with another monitored network event that also satisfies the criteria of the rule, and merge the one of the monitored network events and the another monitored network event to form a business event.

23. The system of claim 20, wherein the tracking computer further configured to execute computer-executable instructions to interpret the monitored network events is further configured to:

apply a base-value to each of the business events and one or more modifiers to the base-value to obtain a macro value for each of the business events, and determine a settlement distribution from the entity to the first service provider or the second service provider, or combination thereof;

compare at least one business attribute of at least one of the business events against pre-determined values listed in a validation strategies table;

update a macro value counter included in the database wherein the macro value counter keeps a count that represents a total sum of a plurality of macro values of the respective business events; and receive one or more conditioned event objects, wherein the one or more conditioned event objects are generated from information contained within the business events.

24. A computer-readable medium for use by a tracking computer that is operable to track network events, the computer-readable medium having stored thereon computer-executable instructions to:

store in a database a plurality of rules corresponding to a plurality of contractually predefined clauses and a plurality of predefined contractual obligations corresponding to a contract between at least two of a plurality of service providers and an entity other than an end user, the at least two of the plurality of service providers comprising a first service provider and a second service provider;

monitor network traffic for network events representative of an electronic transmission and a non-electronic transaction, the network events transmittable across a plurality of different platforms comprising a first platform and a second platform, the network events transmittable by the first service provider and the second service provider separately operable on the first platform and the second platform, respectively, the first platform and the second platform each comprising only one of an internet platform, a cable platform, or a satellite communications platform, the first platform and the second platform being different platforms;

identify from among the network events a set of network events that are conducted in accordance with a predefined contractual relationship between the first service provider and the second service provider and the entity;

associate at least one of the network events within the set of network events with at least one other network event included in the set to define a client session; and apply rules that are part of the contractual relationship to at least one of the network events within the client session to define a contractual event.

25. The computer-readable medium of claim 24, wherein the computer-executable instructions further comprise instructions to transform at least one of the network events from the set of network events that are conducted in accordance with a predefined contractual relationship into a business event.

26. The computer-readable medium of claim 24, further comprising computer executable instructions to selectively associate the network events with each other, and determine the order of the associated network events.

27. The computer readable medium of claim 24, further comprising computer executable instructions to provide for each of the plurality of network events a tracking ID and a transaction ID.

28. The computer-readable medium of claim 24, further comprising computer executable instructions to interpret the contractual event to generate settlement events between the entity and the first service provider or the second service provider.

29. The computer-readable medium of claim 25, further comprising computer executable instructions to:
   interpret the business event based on one of the predefined contractual obligations corresponding to the predefined contractual relationship;
   generate a conditioned event that includes a determined valuation of the business event based on the predefined contractual obligation;
   batch the business event with another business event into a distinct bundle of similar business events that are matched to a contract clause in the contract; and
   group the batch of business events by a contract clause identifier indicative of the contract clause.

30. The computer-readable medium of claim 29, further comprising computer executable instructions to determine a settlement distribution between the entity and the first service provider or the second service provider based on the conditioned event.

31. A computer-readable medium having stored thereon a data structure comprising:
   rules to monitor network traffic for network events conducted across a plurality of different platforms in a network, the different platforms comprising a first platform and a second platform, the network events transmittable by a first service provider and a second service provider, respectively, the first platform and the second platform each comprising only one of an internet platform, a cable platform, or a satellite communications platform, the first platform and the second platform being different platforms, the network events representative of a electronic transmission and a non-electronic transaction, at least one of the network events representative of the non-electronic transaction and transmittable by the first service provider;
   rules to identify from among the network events those network events conducted in accordance with a predetermined contractual relationship between the first service provider, the second service provider and an entity other than an end user;
   rules to match the identified network events to a contractual term of the predetermined contractual relationship; and
   rules to create a settlement event indicative of settlement of the identified network events in accordance with the contractual term matched thereto, and the predetermined contractual relationship between the entity and the first service provider, and the second service provider.

32. The computer-readable medium of claim 31, wherein the rules to match the identified network events further comprise:
   rules to convert a subset of the identified network events matched to the contractual term into a business event according to the contractual terms of the predetermined contractual relationship; and
   rules to interpret the business event according to the contractual terms of the predetermined contractual relationship.

33. The computer-readable medium of claim 31, wherein the rules to create a settlement event further comprise rules to publish the settlement event so that the predetermined contractual relationship can be monitored.

34. The computer-readable medium of claim 31, wherein the rules to create a settlement event further comprise rules to monitor with performance data related to the settlement event to confirm the settlement event.

35. The computer-readable medium of claim 31, wherein the rules to match the identified network events further comprise rules to validate each of the identified network events that confirm a format and a structure of the identified network events, and rules to assign a status code indicative of the validity or invalidity of each of the identified network events.

36. The computer-readable medium of claim 31, wherein the rules to match the identified network events further comprise rules to compare each of the identified network events to a template to determine the identified network events satisfy a predetermined criteria.

37. The computer-readable medium of claim 32, wherein the rules to create a settlement event further comprise rules to apply a value determination to the business event to determine a settlement payment distribution according to the contractual terms of the predetermined contractual relationship.

* * * * *

UNITED STATES PATENT AND TRADEMARK OFFICE
CERTIFICATE OF CORRECTION

| | | |
|---|---|---|
| PATENT NO. | : 7,552,205 B2 | Page 1 of 1 |
| APPLICATION NO. | : 10/152890 | |
| DATED | : June 23, 2009 | |
| INVENTOR(S) | : Peter Craig Lamb et al. | |

It is certified that error appears in the above-identified patent and that said Letters Patent is hereby corrected as shown below:

On the Title Page item 56

Page 2, left column, line 14, under "OTHER PUBLICATIONS", after "documentum.com/" replace "produts/" with --products/--.

Page 2, under "OTHER PUBLICATIONS", insert --Sanborn, S., "Content management expands its role," February 19, 2001, Infoworld, p. 38--.

In the Specification

In column 5, line 27, after "both the wide" replace "are" with --area--.

In column 9, line 51, after "of the tracking" replace "Ids" with --IDs--.

In column 14, line 65, after "if conditioning" replace "and-settlements" with --and settlements--.

In column 18, line 1, after "required fields" replace "fro" with --from--.

In column 18, line 53, after "processing application" replace "068" with --608--.

In column 18, line 62, after "occurrence counts" replace "fro" with --from--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,552,205 B2 | Page 1 of 1 |
| APPLICATION NO. | : 10/152890 | |
| DATED | : June 23, 2009 | |
| INVENTOR(S) | : Lamb et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Seventh Day of August, 2012

David J. Kappos
*Director of the United States Patent and Trademark Office*